(12) United States Patent
Tomaselli et al.

(10) Patent No.: US 11,044,106 B2
(45) Date of Patent: *Jun. 22, 2021

(54) SYSTEM FOR SECURE ACCELERATED RESOURCE ALLOCATION

(71) Applicant: Innovation Finance USA LLC, Fairport, NY (US)

(72) Inventors: Mark Tomaselli, Macedon, NY (US); William H. Verhelle, Jr., Naples, FL (US)

(73) Assignee: Innovation Finance USA LLC, Fairport, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,769

(22) Filed: Jun. 5, 2019

(65) Prior Publication Data

US 2020/0252223 A1 Aug. 6, 2020

Related U.S. Application Data

(60) Provisional application No. 62/800,191, filed on Feb. 1, 2019, provisional application No. 62/812,766, filed on Mar. 1, 2019.

(51) Int. Cl.
*H04L 9/32* (2006.01)
*G06F 40/10* (2020.01)
(Continued)

(52) U.S. Cl.
CPC .......... *H04L 9/3268* (2013.01); *G06F 9/5005* (2013.01); *G06F 40/10* (2020.01);
(Continued)

(58) Field of Classification Search
CPC ... H04L 9/3268; H04L 9/3234; H04L 9/0643; G06F 40/10; G06F 9/5005; G06K 9/344; G06Q 40/02
(Continued)

(56) References Cited

U.S. PATENT DOCUMENTS 9,607,236 B1 3/2017 Wilbert et al.
2008/0040259 A1* 2/2008 Snow .................. G06Q 40/025
705/38

(Continued)

FOREIGN PATENT DOCUMENTS

CN 111526173 A 8/2020
IN 202014004206 A 8/2020
WO WO-2006/079878 A1 8/2006

OTHER PUBLICATIONS

"U.S. Appl. No. 16/696,704, Non Final Office Action dated Mar. 23, 2020", 23 pgs.
(Continued)

*Primary Examiner* — Jacob Lipman
(74) *Attorney, Agent, or Firm* — Schwegman Lundberg & Woessner, P.A.

(57) ABSTRACT

Disclosed in some examples are methods, systems, devices, and machine-readable mediums that provide an ability for an entity to independently commence, advance, and complete a resource allocation offer in a matter of minutes as opposed to weeks or months after an automated resource pre-committal process. The system may have several phases, including a setup phase, resource pre-committal phase, an import phase, a processing phase, a verification phase, a resource allocation offer phase, and a resource allocation phase in which the system allocates resources to a vendor.

20 Claims, 28 Drawing Sheets

(51) Int. Cl.
*G06F 9/50* (2006.01)
*G06K 9/34* (2006.01)
*G06Q 40/02* (2012.01)
*H04L 9/06* (2006.01)

(52) U.S. Cl.
CPC .............. *G06K 9/344* (2013.01); *G06Q 40/02* (2013.01); *H04L 9/0643* (2013.01); *H04L 9/3234* (2013.01); *H04L 2209/38* (2013.01)

(58) Field of Classification Search
USPC ........................................................ 713/156
See application file for complete search history.

(56) References Cited

U.S. PATENT DOCUMENTS

| | | |
|---|---|---|
| 2011/0137788 A1 | 6/2011 | Merkle |
| 2015/0269433 A1* | 9/2015 | Amtrup .............. H04N 1/00106 382/115 |
| 2015/0341370 A1 | 11/2015 | Khan |
| 2017/0116679 A1 | 4/2017 | Abraham et al. |
| 2017/0161826 A1 | 6/2017 | Packer et al. |
| 2017/0193320 A1 | 7/2017 | Wilbert et al. |
| 2018/0040091 A1 | 2/2018 | Kusens |
| 2018/0260888 A1* | 9/2018 | Paolini-Subramanya ................... G06Q 20/4016 |
| 2019/0066201 A1 | 2/2019 | Berthiaume, Jr. et al. |
| 2019/0130480 A1* | 5/2019 | Brewbaker .......... G06Q 40/025 |
| 2019/0354606 A1 | 11/2019 | Snow |
| 2019/0377988 A1 | 12/2019 | Qi et al. |
| 2020/0252224 A1 | 8/2020 | Tomaselli et al. |

OTHER PUBLICATIONS

"U.S. Appl. No. 16/696,704, Response to Non Final Office Action dated Mar. 23, 2020 filed Apr. 20, 2020", 14 pgs.

"European Application Serial No. 19184806.8, Extended European Search Report dated Jan. 27, 2020", 9 pgs.

"U.S. Appl. No. 16/696,704, Advisory Action dated Sep. 9, 2020", 5 pgs.

"U.S. Appl. No. 16/696,704, Final Office Action dated Jul. 22, 2020".

"U.S. Appl. No. 16/696,704, Response filed Aug. 25, 2020 to Final Office Action dated Jul. 22, 2020", 16 pgs.

"U.S. Appl. No. 16/696,704, Response filed Sep. 18, 2020 to Advisory Action dated Sep. 9, 2020", 15 pgs.

"Canadian Application Serial 3,048,566, Office Action dated Sep. 15, 2020", 5 pgs.

"Canadian Application Serial No. 3,048,566, Response filed Dec. 23, 2020 to Office Action dated Sep. 15, 2020", 22 pgs.

"U.S. Appl. No. 16/696,704, Examiner interview Summary dated Mar. 22, 2021", 2 pgs.

"U.S. Appl. No. 16/696,704, Non Final Office Action dated Feb. 22, 2021", 21 pgs.

* cited by examiner

SYSTEM FOR SECURE ACCELERATED RESOURCE ALLOCATION

CLAIM OF PRIORITY

This patent application claims the benefit of priority, under 35 U.S.C. § 119(e) to U.S. Provisional Patent Application Ser. No. 62/800,191 filed Feb. 1, 2019 and U.S. Provisional Patent Application Ser. No. 62/812,766, filed Mar. 1, 2019 which are both hereby incorporated by reference in their entirety.

BACKGROUND

The explosion of network-based computing brought about by the Internet has led to an increase in online services. As mobile internet-connected devices such as smartphones, tablets, and laptop computers have become more popular, many people have turned to applications and websites accessed in the comfort of their own homes or business locations for fulfilling their needs rather than visiting a physical location of a service provider.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
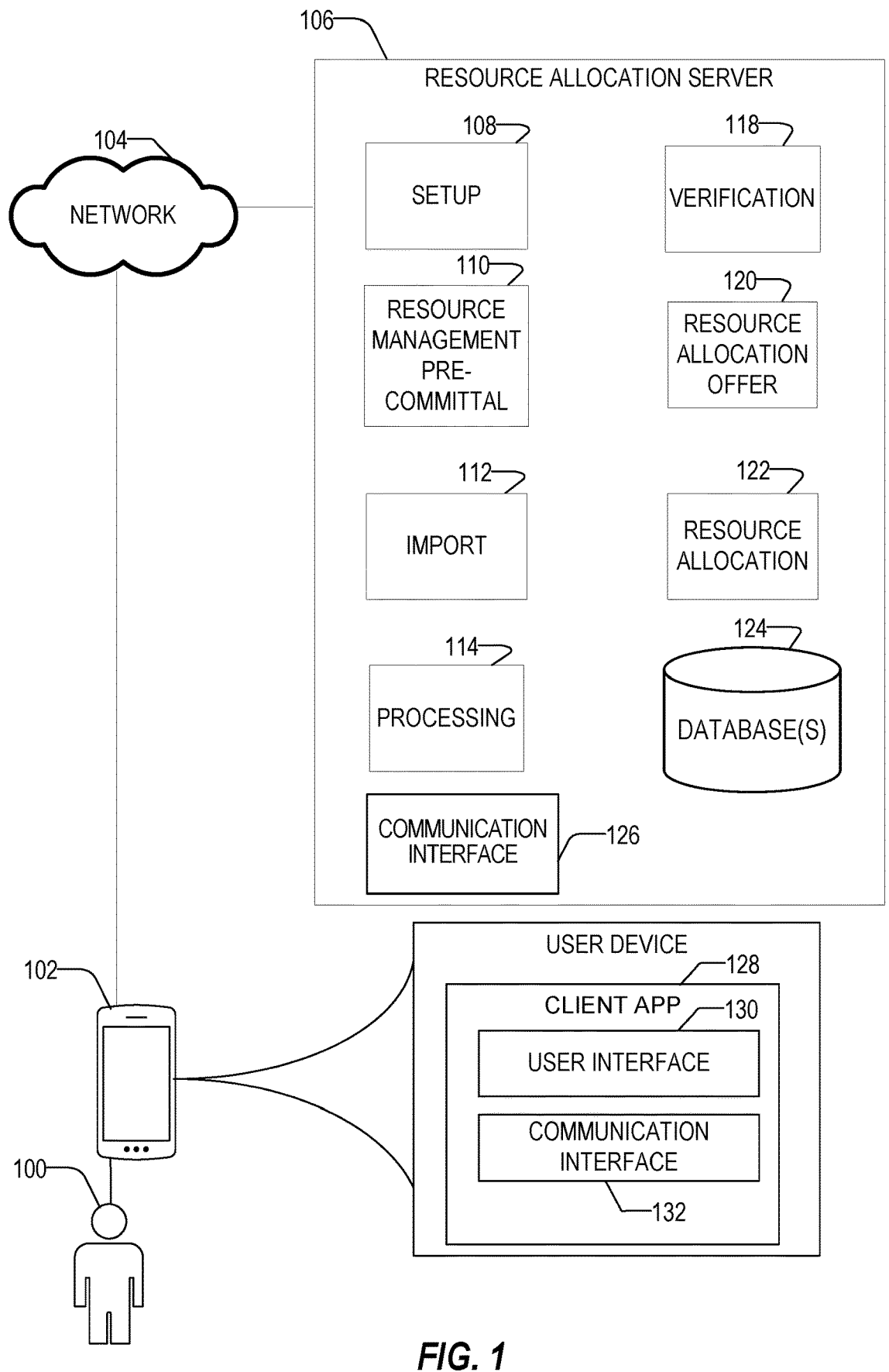
FIGS. 1-3 illustrate variations of a block diagram of an example system for accelerated resource allocation, according to some examples of the present disclosure.

Resource allocation is an example of a service which is largely still done in person via direct communication with physical locations. This is due to the extensive planning and research needed to execute these resource allocations. Traditional resource allocations take a lot of time and require users to wait for resource allocators to move the process along. For example, a traditional allocation process may require a user to meet with an employee of a resource provider to discuss the needs of the user and assess the user's past resource allocation history. Based on this information the employee will provide the user with written, non-digital, resource allocation proposals regarding future resource allocations. From there, the user and the resource provider must negotiate over the terms of the proposal which eventually results in an executed resource grant and the transferring of the requested resources.

The process for resource allocation (e.g., commercial loan financing for equipment purchase or rental), may include a traditional request for proposal, onboarding, and documentation process. In an example of a traditional resource allocation process, once an organization decides to request resources, the organization contacts a resource provider and requests a rate and terms. In this process a resource provider may require a discovery call, and for the organization to sign a non-disclosure agreement before receiving sample terms.

After meetings and discovery calls with the resource provider, the organization receives an initial resource allocation proposal (e.g., financing proposal) which is reviewed with the resource provider.

This process involves considerable waste, not only in terms of the time involved (the entire process can take several weeks or even months to complete) but also resources, as interest rates may change between the time the process is initiated and the final contracts are signed. Likewise, the resource requester must devote considerable time to the process which may constitute an opportunity cost to the resource requester. Furthermore, the process wastes paper resources requiring multiple drafts of the proposals and contracts to be drawn up before a final version is executed. Because different decision makers may be located in more than one place, various papers may need to be transported to multiple locations before they can be finalized. Moreover, the traditional solution requires credit underwriting and approval to occur while the process is ongoing before allocation of the resource. This process is limited because each step requires the resource provider to take affirmative actions to advance the process along and gives the resource requester little to no control over the process.

Disclosed in some examples are methods, systems, devices, and machine-readable mediums that provide an ability for an entity (e.g. a borrower) to independently commence, advance, and complete a resource allocation process, such as commercial loan or lease financing, in a matter of minutes as opposed to weeks or months, after an automated resource pre-committal process. This is accomplished using a resource allocation system in which users authenticate with the system, obtain a resource pre-committal, import a resource allocation request, receive a resource allocation offer including one or more inter-dependent offer parameters, select ones of the inter-dependent offer parameters, and receive the resource.

As a first step, in some examples, a first entity (e.g. a user) may create a profile with the resource allocation system. This may streamline the resource allocation process substantially because the first entity may be granted a resource pre-committal (e.g., a second entity of which the first entity is affiliated may be pre-approved) before applying for new resources (e.g., new financing). The first entity also has more control over the process as the first entity may immediately see options for resource allocations (e.g., such as loan term duration and interest rates). This may allow the first entity to lock in certain terms of the resource allocation (such as an interest rate) without the risk that it will change while the negotiation process of a traditional resource allocation proceeds. Similarly, having documentation of the resource allocation generated instantaneously may allow the transaction to be completed without the traditional back-and-forth negotiation required when working with a resource provider. Depending on whether the first entity wishes to review the documentation in detail prior to acceptance, the entire process may be completed in a matter of minutes or days.

This represents an improvement in existing graphical user interface devices that have no commercial resource allocation analog, that allows for a pre-committal process in conjunction with an in-system ability to upload and supplement information and digital creation and signing of documents. This is also a more transparent process than the traditional resource allocation process because the first entity can see, up front, all the details about the transaction based on the choices he or she makes regarding structure and interest rate. Further, by saving the contractual documents in a private blockchain, with a hash on a public network, a first entity may be able to immediately access documents when needed (e.g. to verify the details of the loan) as opposed to sending a request to a resource provider (e.g., a bank or other financial institution) to get a signed verification. The blockchain storage provides the first entity with an immutable validated copy of the documents which provides assurances that the documents are the originals and have not been altered.

Figure 2:
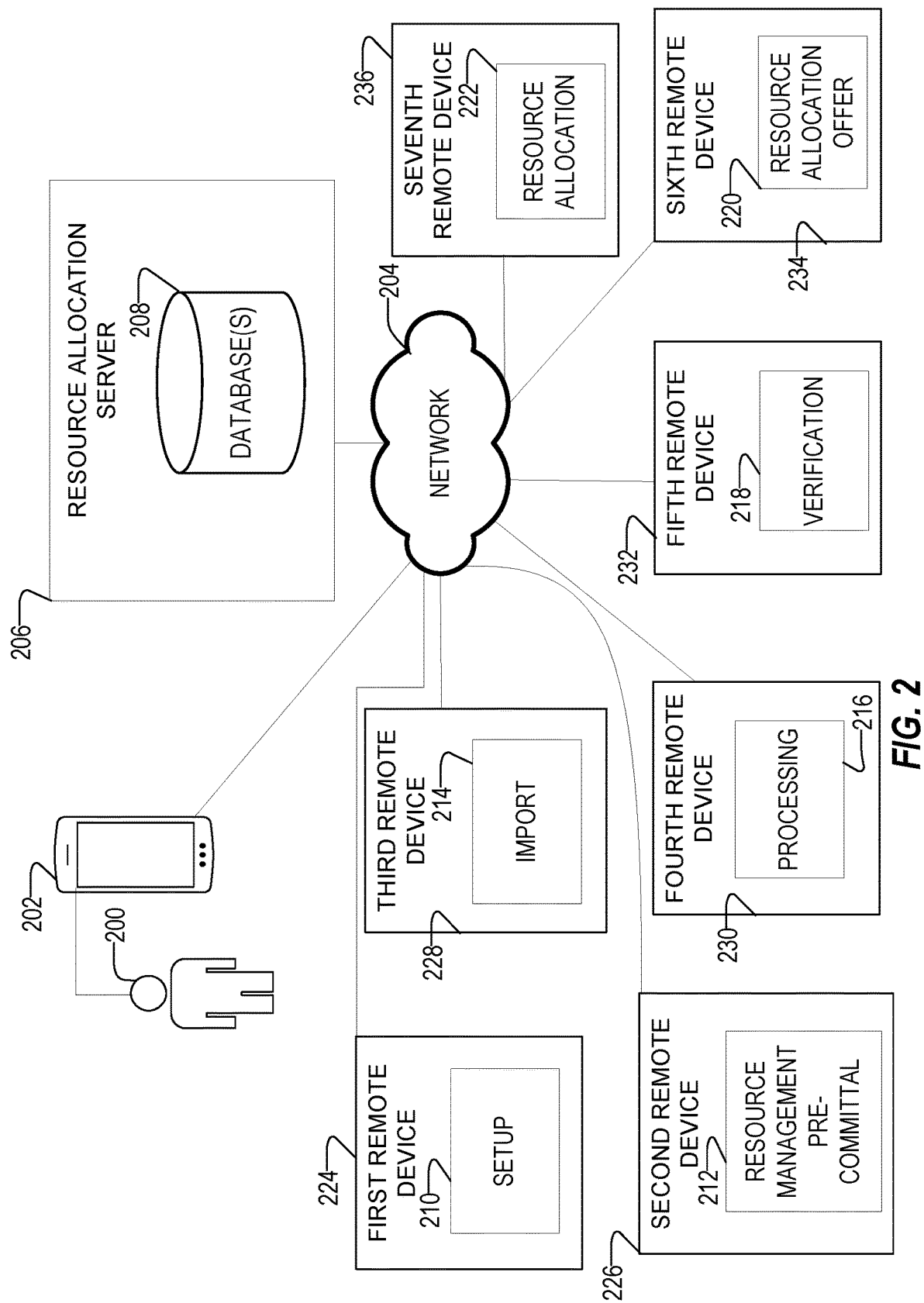
Figure 3:
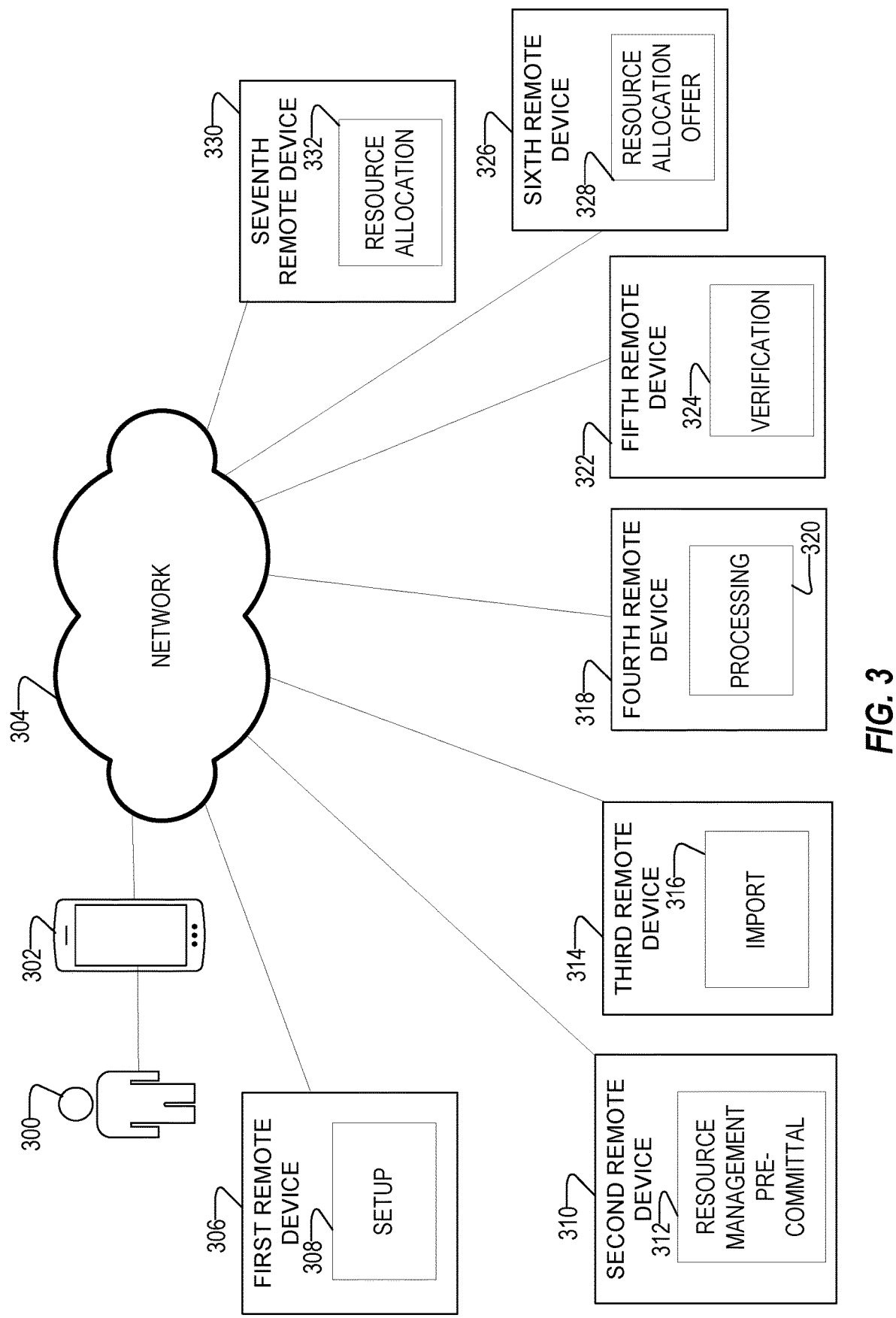

FIGS. 1-3 illustrate variations of a block diagram of an example system for accelerated resource allocation according to some examples of the present disclosure. In the example of FIG. 1, a first entity (e.g. a user) 100, using a device 102 such as, for example, a smart phone or tablet may connect to a resource allocation server 106, over a network 104. In some examples, the network 104 may include a local area network (LAN), a wide area network (WAN), the Internet, or the like. The user device 102 may include a client app 128 which may be downloaded over the network 104. The client app 128 may include a user interface 130 which the user 100 may implement any one or more of the user interfaces shown in FIGS. 13-26, or any similar user interfaces. The client app 128 may also contain a communication interface 132 which may connect to the network 104, or the communication interface 126 on the resource allocation server 106.

In this example, the resource allocation server 106, may be a machine such as described for FIG. 28 below, and may contain a database 124 in which information regarding the entities (e.g. user profiles) or documents such as invoices and copies of executed contracts may be stored. The server may also be configured to execute functionality such as a setup phase 108, a resource management pre-committal phase 110, an import phase 112, a processing phase 114, a verification phase 118, a resource allocation offer phase 120, and a resource allocation phase 122. The resource allocation server 106 may further include a communication interface 126, which may communicate with the communication interface 132 within the client app 128 on the user device 102.

In the example of FIG. 2, such as in the example of FIG. 1, a first entity 200 using a device 202, may connect to a resource allocation server 206 through a network 204. In some examples, the network 204 may include a local area network (LAN), a wide area network (WAN), the Internet, or the like. In this example, the resource allocation server 206, may contain a database 208, in which entity information (such as user profiles), documents (such as invoices and contracts) may be stored. In such a configuration, the resource allocation server may connect, through the network, to other external/remote devices and services (e.g. for example, a file sharing service, an electronic signing service, or the like) that may provide one or more aspects of the functionality of the system. For example, a first remote device 224 may initiate the setup phase 210, a second remote device 226 may initiate the resource management pre-committal phase 212, a third remote device 228 may initiate the import phase 214, a fourth remote device 230 may initiate the processing phase 216, a fifth remote device 232 may initiate the verification phase 218, a sixth remote device 234 may initiate the resource allocation offer phase 220, and a seventh remote device 236 may initiate the resource allocation phase 222.

In the example of FIG. 3, the first entity 300 may connect to a network 304 through a device 302 as described above for FIGS. 1 and 2. In some examples, the network 304 may include a local area network (LAN), a wide area network (WAN), the Internet, or the like. As opposed to FIG. 2, in which a resource allocation server 206 containing one or more databases 208 is connected to a network 204 which, in turn, is connected to the remote devices 224, 226, 228, 230, 232, 234, and 236, in FIG. 3, each remote device 306, 310, 314, 318, 322, 326, and 330, connect to the user device 302, through the network 304 without a separate server.

In this example as in the example of FIG. 2, a first remote device 306 may initiate the setup phase 308, a second remote device 310 may initiate the resource management pre-committal phase 312, a third remote device 314 may initiate the import phase 316, a fourth remote device 318 may initiate the processing phase 320, a fifth remote device 322 may initiate the verification phase 324, a sixth remote device 326 may initiate the resource allocation offer 328, and a seventh remote device 330 may initiate the resource allocation phase 332. The phases 308, 312, 316, 320, 324, 328, and 332 may be entirely performed via sources or applications (such as a file sharing service, an electronic signing service, or the like) connected to the network 304. It is possible that the system described herein may be implemented in any one or a combination of the configurations as shown in FIGS. 1-3.

Figure 4:
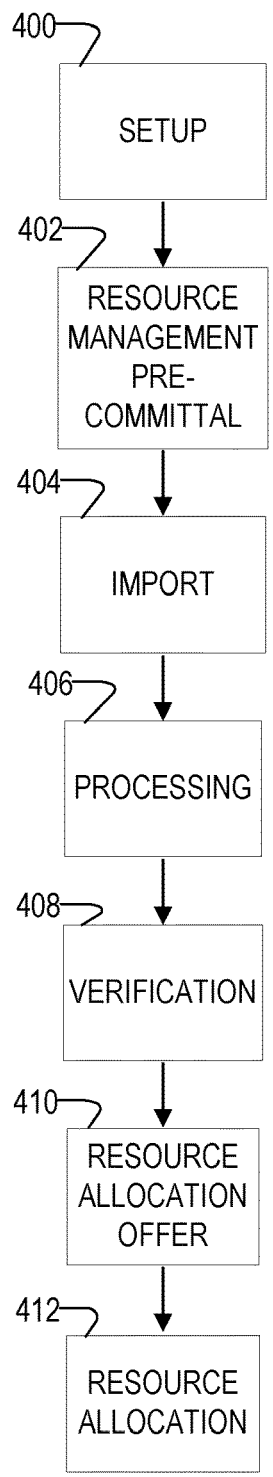
FIG. 4 illustrates a flow chart of a method of accelerated resource allocation phases, according to some examples of the present disclosure.

FIG. 4. illustrates a flow chart of a method of accelerated resource allocation phases according to some examples of the present disclosure. These may consist of a setup phase 400 and resource management pre-committal phase 402 where a first entity (e.g. a user) creates an account and verifies his or her identity, and a second entity (e.g. a company, business or organization) the first entity is affiliated with. An import phase 404 and processing phase 406 in which resource allocation requests (e.g. documents such as invoices) are imported into the system and processed to determine transaction details. The system may further include a verification phase 408 where the first entity verifies the details of the transaction and selects interest rate and duration. A resource allocation offer phase 410 in which the system delivers a copy of a resource allocation offer (e.g. a contract) with the resource allocation (e.g. financing) terms to the first entity, and the first entity digitally signs the contract, and a resource allocation phase 412 in which the system makes payment based on the terms of the resource allocation offer.

Figure 5:
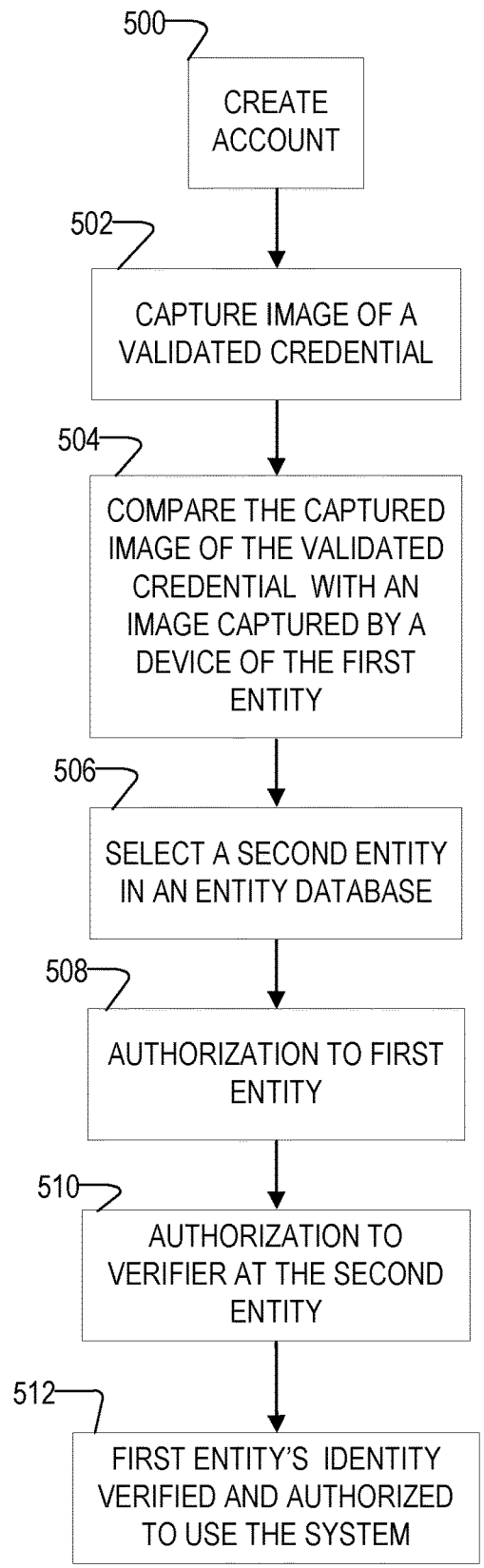
FIG. 5 illustrates a flow chart of a setup phase for an accelerated resource allocation system, according to some examples of the present disclosure.

FIG. 5 illustrates a flow chart of a setup phase for an accelerated resource allocation system according to some examples of the present disclosure. FIG. 5. is one example implementation of setup phase 400 of FIG. 4. In some examples, in the setup phase, a first entity (e.g. a user) may be prompted to create an account, at a create account step 500. This may consist of a number of steps as described for FIG. 14 below. This may also include the first entity entering biographical details (e.g. a name, geographic address, an email address, or the like). In some examples the first entity may be prompted to create an account immediately after accessing the system on a device (such as through an application downloaded to a mobile device). This may be prompted upon downloading and immediately opening the application. In another example, the account setup step 500 may be accessed through a create account link on a home screen or home page of the application.

Figure 15:
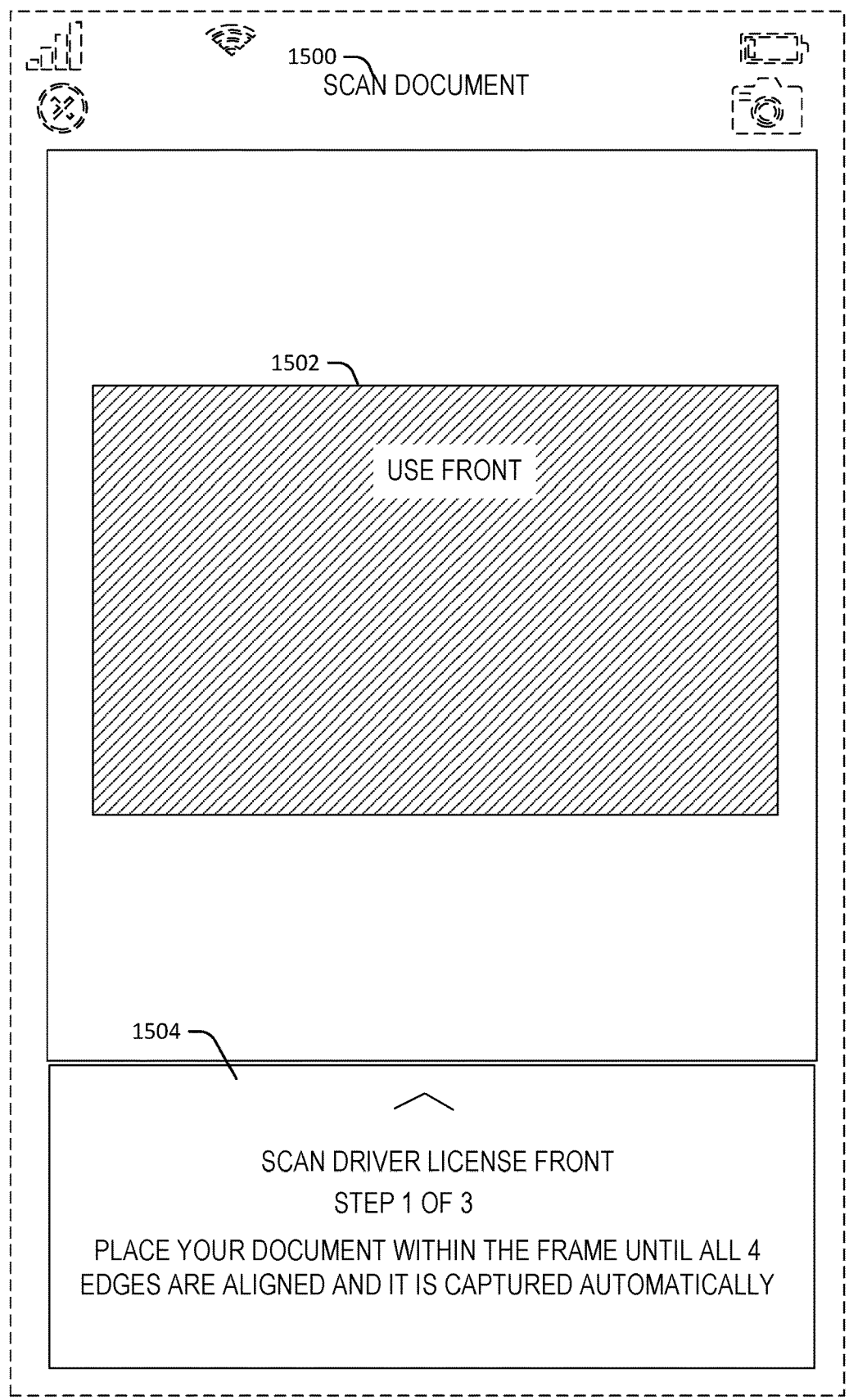
FIG. 15 illustrates a UI of an identification scan page, according to examples of the present disclosure.

The first entity's identity may be verified through a two-part process. The first step may include a step in which the system may capture an image of a validated credential 502. For example, the first entity may be presented with a screen such as shown in FIG. 15 in which the first entity may upload a picture of a government issued identification which contains a biometric (e.g. photograph) of the first entity (e.g. a state-issued driver's license or identification card, a military identification, or a passport). The system identifies, in the image of the government issued identification, a biometric (e.g., a photo of the person's face); information about the first entity such as a name, address, distinguishing physical characteristics, or the like; an id number such as a driver's license number or information from a barcode of the identification (this may require scanning one or both sides of the identification). Some of this information may be used to verify a validity of the identification by submitting the information to a third-party database (e.g., a government database). For example, barcode information of the identification may be sent to an identity database over a network. Information returned may confirm a validity of the identity. In other examples, the information returned may be additional information from the identification (e.g., a name, address, and distinguishing features of the identity card that matches the barcode information). This information may then be matched to the information extracted from the picture to ensure a match. If the information matches, or if the identity database returns that it is a valid identity, then the first entity may be authenticated. If the first entity is not authenticated the first entity is rejected, and the process may end.

In the second step, the system may also validate that the identification used belongs to the first entity of the application by comparing the captured image of the validated credential with an image captured by a device (e.g. a mobile phone) of the first entity (e.g. the user) 504. In step 504, the image may include a biometric captured by a user device executing the system software with the biometric on the government issued identification. For example, the camera on the first entity's phone may capture their face in a capture sequence. The capture sequence may verify that the first entity is not holding up a picture (for example, in an attempt to "trick" or otherwise deceive the system or get around the validation step) by asking for a number of poses of the first entity. For example, the system may require the first entity to take a picture from different angles (such as from a side, straight on, or the like) or different facial expressions (e.g. a smile or a neutral expression). This may allow the system to ensure that the first entity is an individual. If the system fails to validate the identification used belongs to the first entity in this second step, the system may reject the first entity as one authorized to use the system and may discontinue the setup phase, or otherwise not allow use of the system.

In some examples, once the first entity is verified, the first entity may proceed to a step 506 to select a second entity from a database, matching the entity of which the first entity is associated. The database may be the databases 124 or 208 in FIGS. 1 and 2, or another database connected to the network, such as the networks 104, 204, and 304 in FIGS. 1-3. In some examples, the networks 104, 204 and 304 may include a local area network (LAN), a wide area network (WAN), the Internet, or the like.

The second entity may be an organization (e.g. corporation, company or other business organization) with which the first entity is affiliated. In some examples, there may be a database such as the databases 124 or 208 in FIGS. 1 and 2, or another database connected to the network, such as the networks 104, 204, and 304 in FIGS. 1-3, of valid organizations that may be indexed by organization identification and/or name. The first entity may select one of the organizations in the database.

Figure 16:
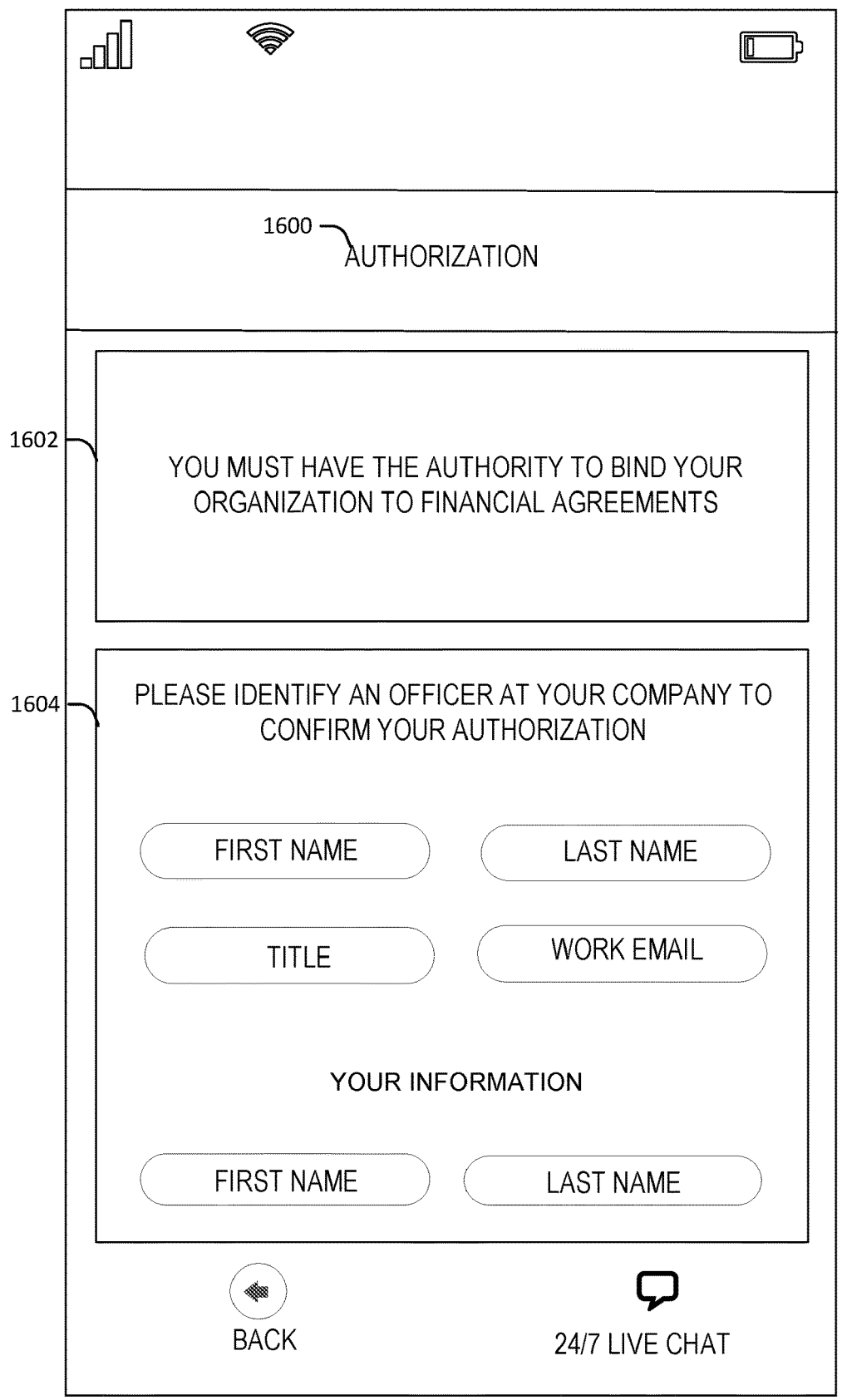
FIG. 16 illustrates a UI of a first entity authorization page, according to examples of the present disclosure.

Once a verified organization is selected, at operation 508, the first entity may be presented with an authorization screen, such as shown in FIG. 16 below, in which the first entity enters the name and email address of a verifier (e.g. executive, officer, director, vice president, or president) with the second entity. In some examples, to confirm that the verifier is with the organization, one or more domain rules may be enforced on the entered email. For example, the organization database may have information on email domains associated with the organization. In these examples, the email address entered may be restricted to domains associated with the organization. In other examples, certain domains known to be used for personal email addresses may be blacklisted. For example, the domains yahoo.com, gmail.com, hotmail.com, or other similar domains.

Once the first entity completes the information on the authorization screen, the system may proceed to a step where the authorization is sent to the verifier at the second entity 510. In this step, the system may generate and forward over a network a digital authorization (e.g. a certificate of incumbency) to the verifier which attests that the verifier is an authorized representative of the organization and that the verifier attests that the first entity has authority to act on behalf of the organization.

In a final step of the setup phase 512, the first entity's identity is verified and authorized to use the system. This step may consist of the verifier digitally signing the authorization acknowledging the first entity's authority to bind or act on behalf of the organization, the first entity may be considered by the system as an authorized user, able to upload resource allocation requests to the system and request resource allocation.

In some examples, the system may also allow for an additional user or users to be added as authorized users. In this embodiment, an authorized first entity is presented with a certificate of incumbency to authorize the additional user. In another embodiment, there may be different levels of permissions, which gives an additional user access to only certain features of the system. For example, the additional user may only be able to upload documents to the system, but not submit the documents, or digitally sign contracts. Or, the additional user may have full access to the system with the ability to submit documents, select terms, and complete transactions.

Figure 6:
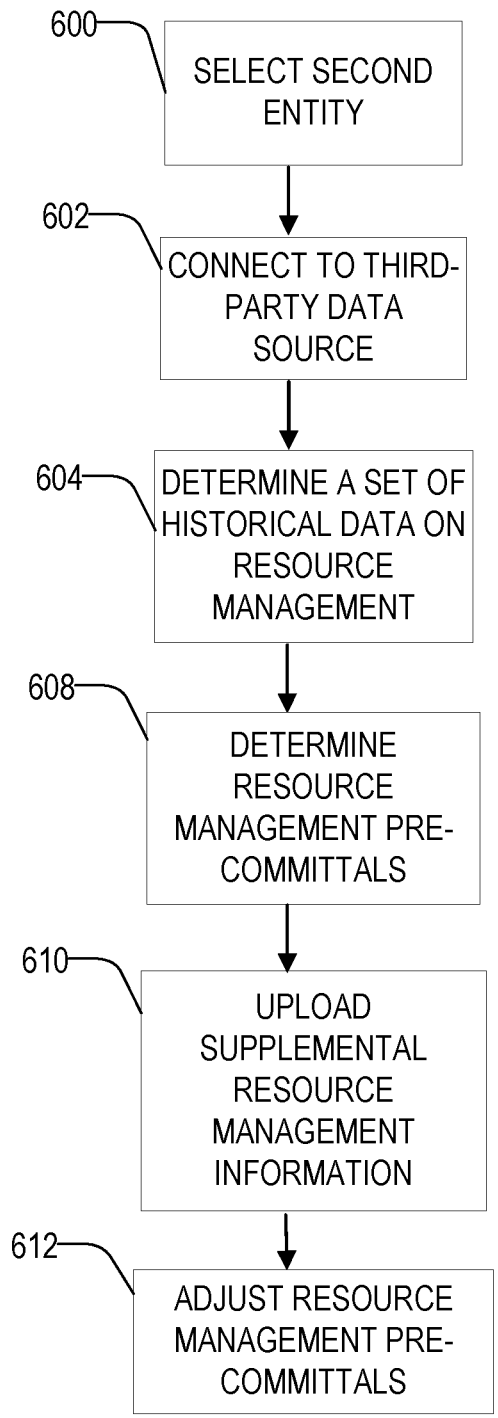
FIG. 6 illustrates a flow chart of a resource management pre-committal phase for an accelerated resource allocation system, according to some examples of the present disclosure.

FIG. 6 illustrates a flow chart of a resource management pre-committal phase for an accelerated resource allocation system according to some examples of the present disclosure. FIG. 6 is one example implementation of resource management pre-committal phase 402 of FIG. 4. This phase may be implemented separately or in conjunction with the setup phase 400 of FIG. 4, and as described for FIG. 5 above. An initial step in the resource pre-committal phase may be to select a second entity 600. In an example, step 600 may be done in conjunction with operation 506 of the setup phase. In another example, the first entity may act as a first entity for multiple second entities. In such an example, the first entity may perform operation 600 by selecting a particular one of a second entity from a list of second entities.

At operation 602, the system may connect to a third-party data source. This may allow the system to determine a set of resource management pre-committals at operation 608. These pre-committals may include parameters such as resource allocation limits for the entity (e.g., a credit limit), term limits, rate modifiers (e.g., interest rate modifiers), and the like. These parameters may be determined based on a set of historical data on resource management obtained at operation 604, which may include the past resource allocation data (e.g., credit history) of the second entity obtained from one or more third-party data sources such as credit reporting agencies, social networking services, business databases (e.g., DUN AND BRADSTREET®), and the like. In some examples, the system may connect to the third-party data sources at operation 602 over a network to get information regarding the organization (e.g. credit score, liens, judgments, revenue, years in business, number of employees, or paid indicators (how likely the organization is to pay on time)) which may make up a portion of the set of historical data on resource management determined at operation 604, and which will be sent to the system's server over a network. The system may then process the information obtained from the third-party using an algorithm (e.g. a linear function, a logistic regression function, or the like) to determine pre-committal parameters, which may be used to determine a set of resource management pre-committals (e.g. an initial level of financing, an initial rate of interest, or the like) at operation 608 for the second entity. In an embodiment, the pre-committal parameter may be one or more scores.

In another embodiment at operation 1610, the user may upload supplemental resource management information (e.g. profit and loss statement) directly into the system. The system may then automatically process the documents by applying an OCR process to the document to convert an image to text. The system may then utilize a natural language analysis to determine what the document is (e.g., a profit and loss statement, income statement, bank statement, or the like), and to extract relevant financial fields. These relevant financial fields may then be used in operation 612 to adjust the pre-committal parameters for the organization. This may allow the organization to obtain adjusted resource management pre-committals (e.g. a lower interest rate and/or an increased level of financing). In an embodiment, the system may update the pre-committal parameters and repeat operation 612 to adjust the resource management pre-committals at predetermined intervals (e.g. quarterly) and adjust the organization's resource management pre-committals.

Figure 7:
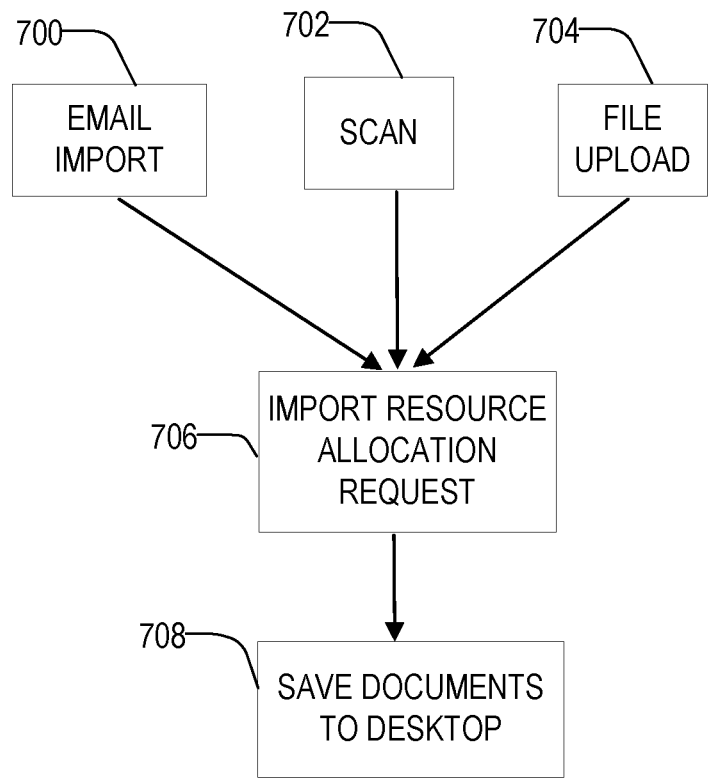
FIG. 7 illustrates a flow chart of an import phase for an accelerated resource allocation system, according to some examples of the present disclosure.
Figure 17:
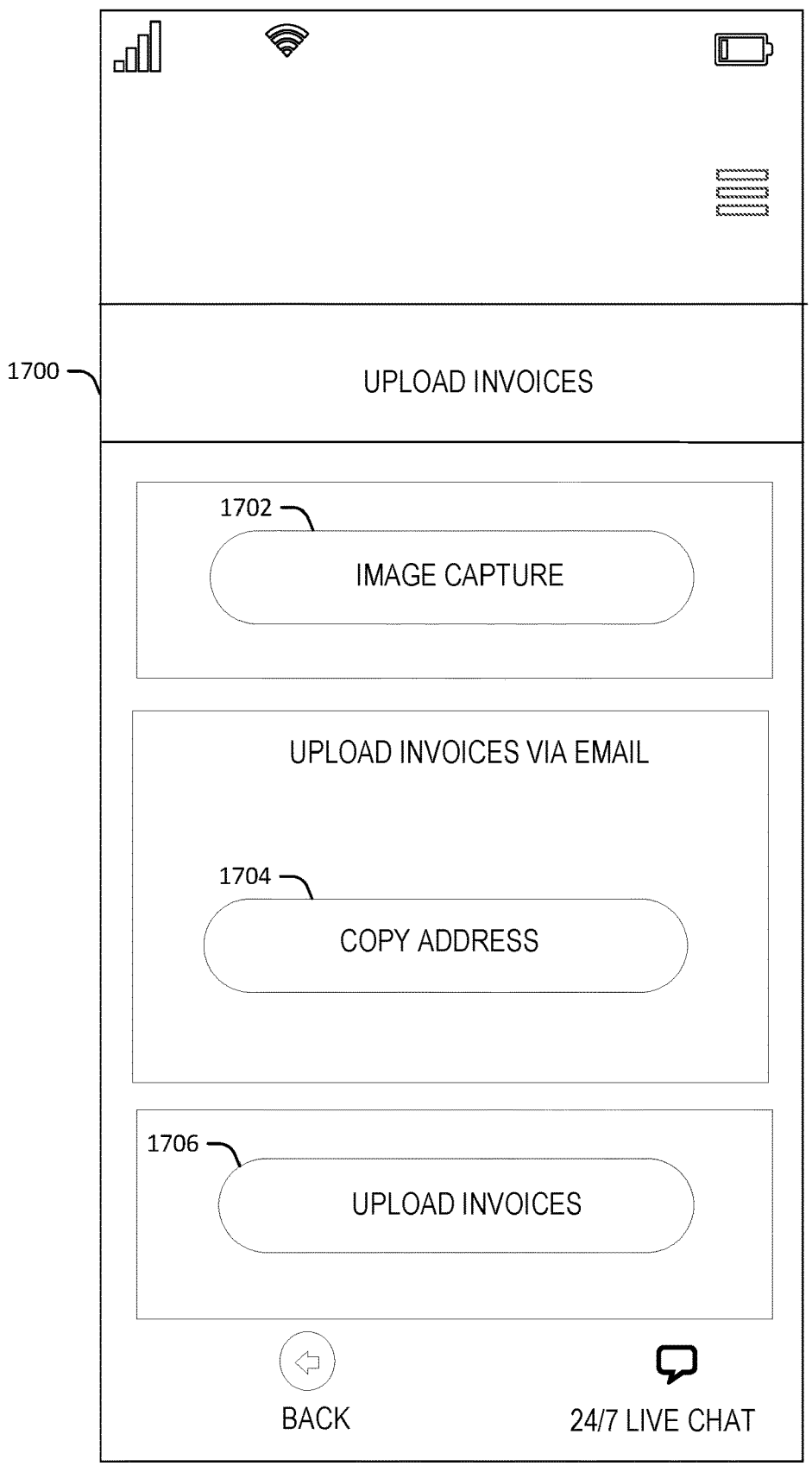
FIG. 17 illustrates a UI of a resource allocation request import page, according to some examples of the present disclosure.

FIG. 7 illustrates a flow chart of an import phase for an accelerated resource allocation system according to some examples of the present disclosure. FIG. 7 is one example implementation of import phase 404 of FIG. 4. In the import phase, a first entity whose identity is verified in the resource pre-committal phase may import a resource allocation request 706 (e.g. documents such as an invoice or equipment lease) into the system. The documents may be imported into the system in several different ways, through a user interface as shown in FIG. 17. This may include importing documents through operation 702, via scan. In this example the documents may be scanned through the camera on a smartphone, tablet, or other handheld device. Another mechanism through which documents may be imported is through file upload 704, or email import 700. For example, a first entity may email a document as an attachment to an email address associated with the resource management system. A first entity who chooses email import 700 to import documents may be presented with a user interface such as in FIG. 18, which may instruct the first entity how to import documents through email import 700.

In other examples, the file upload may allow first entities to select one or more documents to upload. Resource allocation requests 706 imported via email import 700 or file upload 704 may include scanned images of original documents (such as a scanned PDF, JPEG or other like image file) or an original word processing, PDF or other like text file. In still other examples, other forms of importing may be used. For example, a first entity may separately upload a document to a file-sharing service and may share the document with an email address associated with the resource management service. In other examples, a first entity may obtain a HyperText Transfer Protocol (HTTP) link to the document on the file-sharing service and may submit the link to the resource management service.

Figure 22:
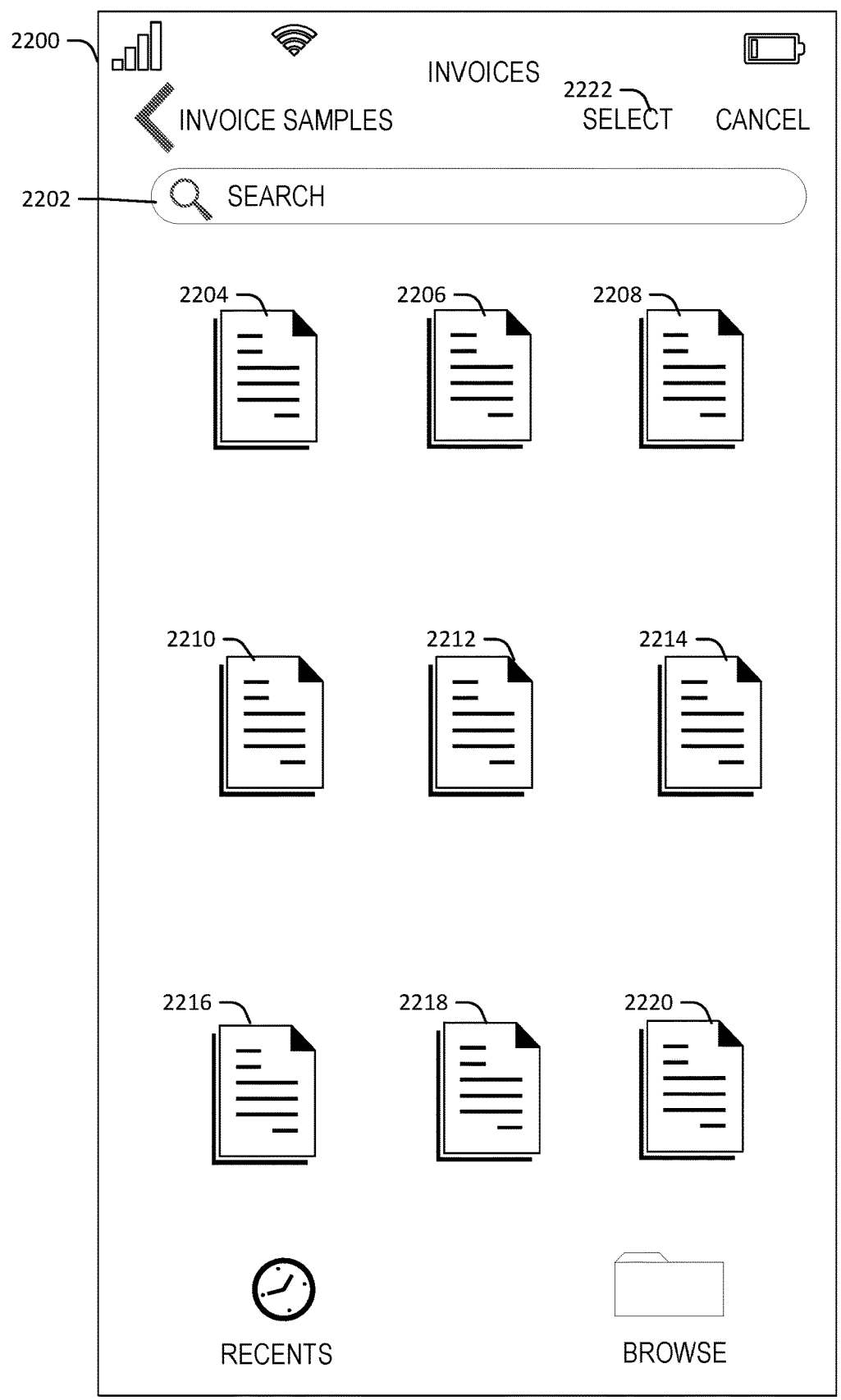
FIG. 22 illustrates a UI of an imported resource allocation request dashboard according to some examples of the present disclosure.

At operation 708, once the resource allocation request documents are imported into the system the documents may be saved to the dashboard or desktop on the system, such as shown in FIG. 22. First entities may browse through and view uploaded documents. In some examples, the documents may be stored by the system on a database, such as the databases 124 or 208 in FIGS. 1 and 2. In another example, the database may be connected to a network, such as the networks 104, 204, and 304 in FIGS. 1-3. In such an example the database may be managed and operated by the system or by a third party—for example, a network-based file sharing service.

Figure 8:
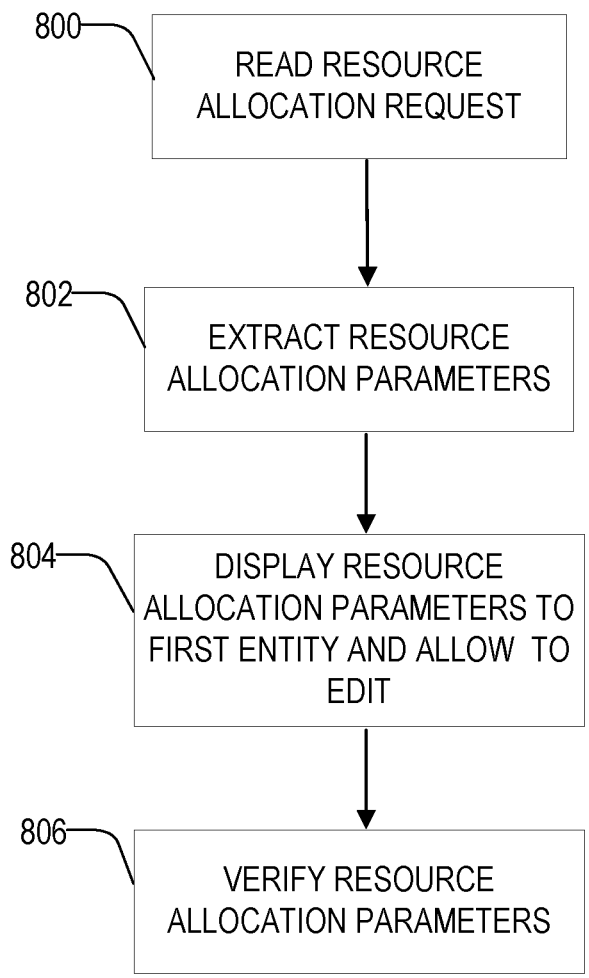
FIG. 8 illustrates a flow chart of a processing phase for an accelerated resource allocation system, according to some examples of the present disclosure.

FIG. 8 illustrates a flow chart of a processing phase for an accelerated resource allocation system according to some examples of the present disclosure. FIG. 8 is one example implementation of processing phase 406 of FIG. 4. In an example of the processing phase, the first entity may submit the resource allocation requests documents to a processing phase in which the system may, read the resource allocation request at operation 800, extract the resource allocation parameters at operation 802, and then display to the first entity (the user) at operation 804, the resource allocation parameters. The resource allocation parameters may include the key characteristics of the transaction (e.g. vendor information and dollar amount). During operations 800 and 804, the system may display a user interface such as at FIG. 19.

In an embodiment, at operation 800 the system may recognize a plurality of transaction parameters from an image of the resource allocation request. Transaction parameters may include price, vendor information, equipment information, quantity information, and the like. This analysis may be done through a combination of one or more of optical character recognition (OCR) and artificial intelligence (AI) processing of the documents, such as a Natural Language Processing (NLP) process. At operation 804, the system may then give the first entity the opportunity to verify the resource allocation transaction parameters, including the details of the transaction, and make any necessary changes to the details. In this step, the first entity may be presented with the user interfaces shown in FIG. 20 and FIG. 21.

In an example, the first entity may select a submitted resource allocation request (e.g., an invoice) for processing. The resource allocation request may be sent to an OCR process where the text of the resource allocation request is extracted from the image of the request. The text is then used as input to a processor to determine one or more transaction parameters from the OCR'd text. For example, an NLP algorithm. In some examples, the NLP may look for one or more specific text phrases (e.g., the word "Total Due" before the price) to determine the transaction parameters. In some examples, the NLP may be trained using one or more supervised learning algorithms. For example, a number of sample training invoices may be labeled with the appropriate transaction parameters and the supervised learning algorithm may utilize the training data set to build an NLP model. The processing may be done at the system or via a third-party service. For example, the system may send the image of the documents to a third-party service for processing using an application programming interface (API) and the service may return the transaction parameters.

The transaction parameters may be displayed to the first entity and the first entity may edit the transaction parameters detected by the system. In some examples, the system may "learn" to more effectively analyze the details of transactions based on any changes a first entity makes at this step. This may be done through an algorithm run by the processing circuitry (e.g. boosting) to automatically adapt based on changes a first entity enters. For example, the image and/or OCR output may be labelled with the corrected transaction parameters and then used as training input to refine or retrain a supervised model (e.g., for either the OCR process or for the NLP).

Figure 9:
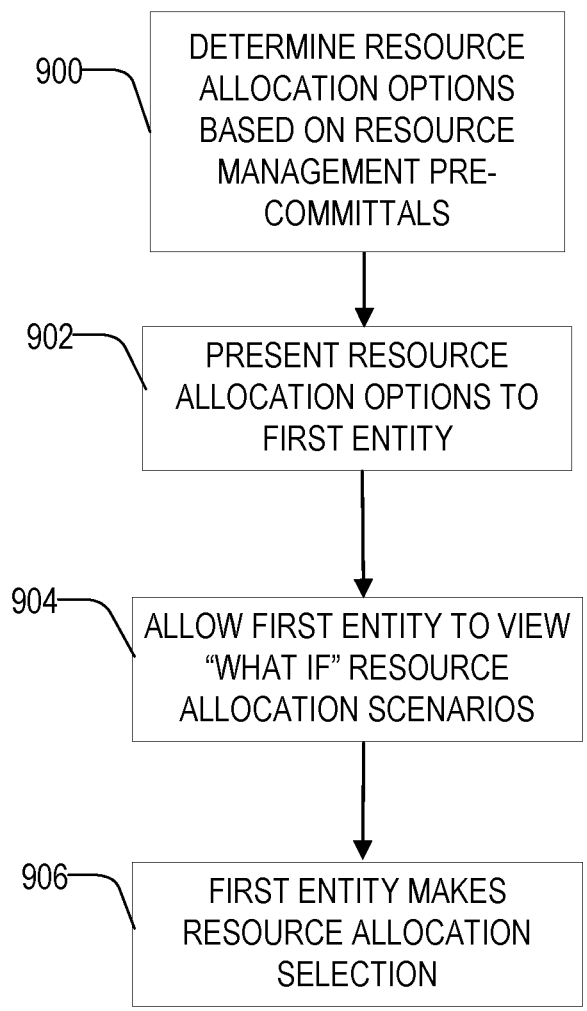
FIG. 9 illustrates a flow chart of a verification phase for an accelerated resource allocation system, according to some examples of the present disclosure.

FIG. 9 illustrates a flow chart of a verification phase for an accelerated resource allocation system according to some examples of the present disclosure. FIG. 9 is an example of implementation of verification phase 408 of FIG. 4. At operation 900, in some examples, the system may determine a plurality of resource allocation options based upon the resource management pre-committals and the resource allocation parameters from the resource allocation request. In another example, the plurality of resource allocation options may be based on pre-committal parameters (e.g., resource pre-committal parameters), market parameters, and transaction parameters. Resource allocation options may include a structure (e.g., rent or loan of the resource), a term, an interest rate, and the like. These options may be set based upon a set of one or more rules that may factor in the pre-committal parameters, market parameters, transaction parameters, and the like. The rules may be created based upon an administrator of the system, or the like. For example, a rule may specify rules on how long a resource allocation (e.g. financing) term can be based upon the total amount of resources being requested, an outstanding balance of the second entity, and the second entity's pre-committal parameters. Another rule may specify the interest rate based upon market parameters, transaction parameters, and the like. In some examples, the options available may change depending on other options. For example, a first entity may select a term, which may affect the interest rate.

Figure 23:
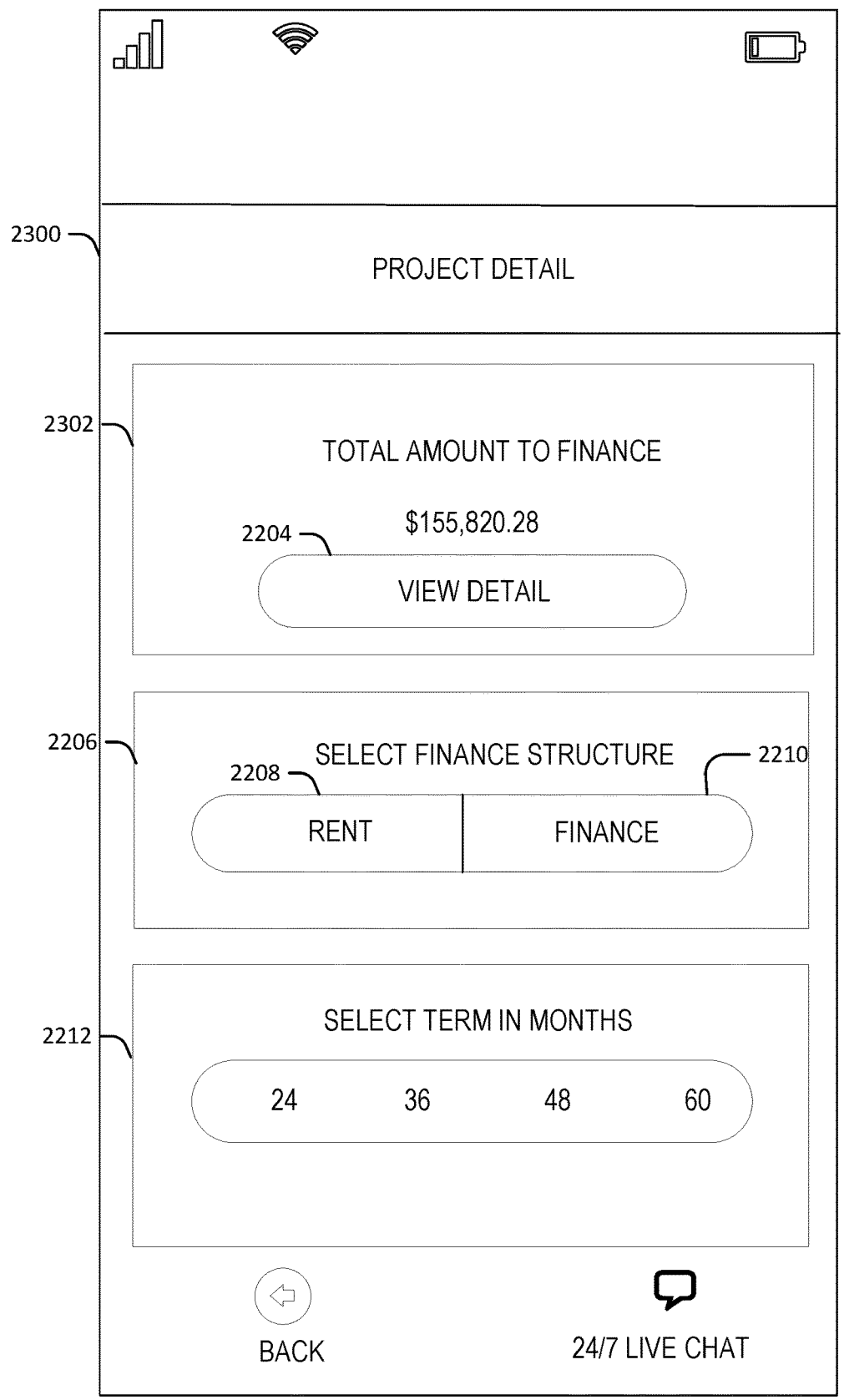
FIG. 23 illustrates a UI of a resource allocation detail page, according to some examples of the present disclosure.

At operation 902 the system may then present the resource allocation options to the first entity, such as through a user interface in FIG. 23. In one example, the resource allocation options may be tied to a particular one, but not any other one, of the resource allocation requests. For example, a single invoice or lease may have a particular financing term and a particular interest rate. In another example, resource allocation options may be tied to more than one resource allocation requests, such as a group of invoices or leases, in which the financing term and interest rate may be different than resource allocation options available for a single resource allocation request.

In another embodiment, the system may also allow a first entity at operation 904 to view one or more "what-if" resource allocation scenarios. For example, they system may perform an analysis to compare combinations of invoices or leases and financing structures. For example, a first entity may wish to view the cost of submitting an invoice at a variable interest rate for a shorter duration, versus a fixed interest rate for a longer duration. The system may allow the first entity to see a comparison of each financing option. Once the first entity verifies the details of the transaction, the system may move onto a resource allocation offer phase.

At operation 906 the first entity may make a resource allocation selection. This may be done through a user interface such as in FIGS. 23 and 24 in which the first entity may choose a resource allocation structure (e.g. renting or financing) and a term/duration (e.g. number of months). In response to the first entity's selections, the system may proceed to generate a resource allocation offer.

Figure 10:
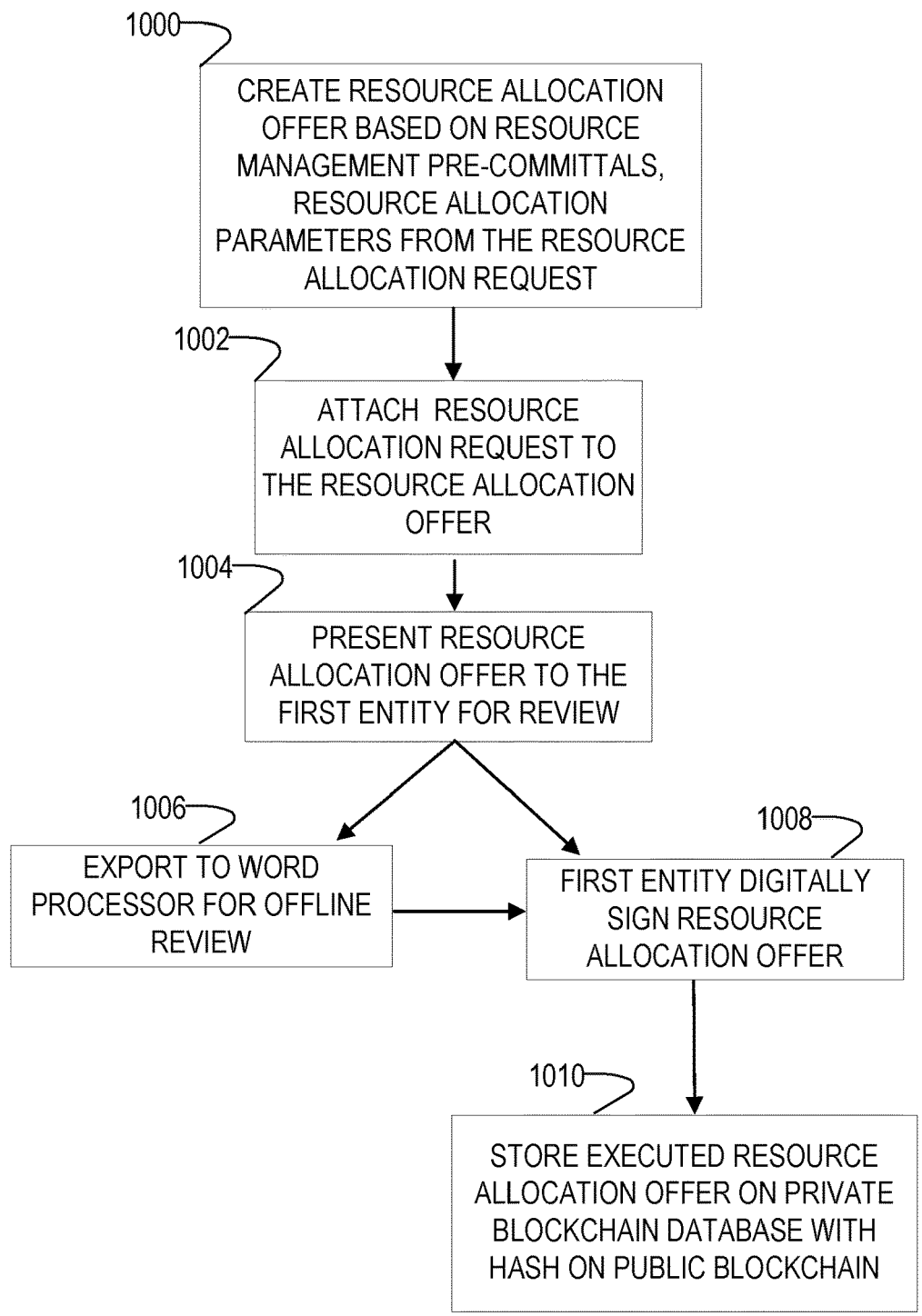
FIG. 10 illustrates a flow chart of a resource allocation offer phase for an accelerated resource allocation system, according to some examples of the present disclosure.

FIG. 10 illustrates a flow chart of a resource allocation offer phase for an accelerated resource allocation system according to some examples of the present disclosure. FIG. 10 is an example embodiment of resource allocation offer phase 410 in FIG. 4. In an example of the resource allocation offer phase, at operation 1000, the system may create a resource allocation offer (e.g. a financing contract) based on resource management pre-committals and resource allocation parameters from the resource allocation request. For example, automated digital contracts may be assembled, summarized, and presented to the first entity for digital signing. In this phase, the system may insert the correct pricing and financing information into a single, digital, fully integrated contract. At operation 1002, the system may attach the resource allocation request to the corresponding resource allocation offer. For example, the system may attach the scanned documents (e.g. an invoice or lease) corresponding to a particular contract for the selected structure and selected term.

Figure 25:
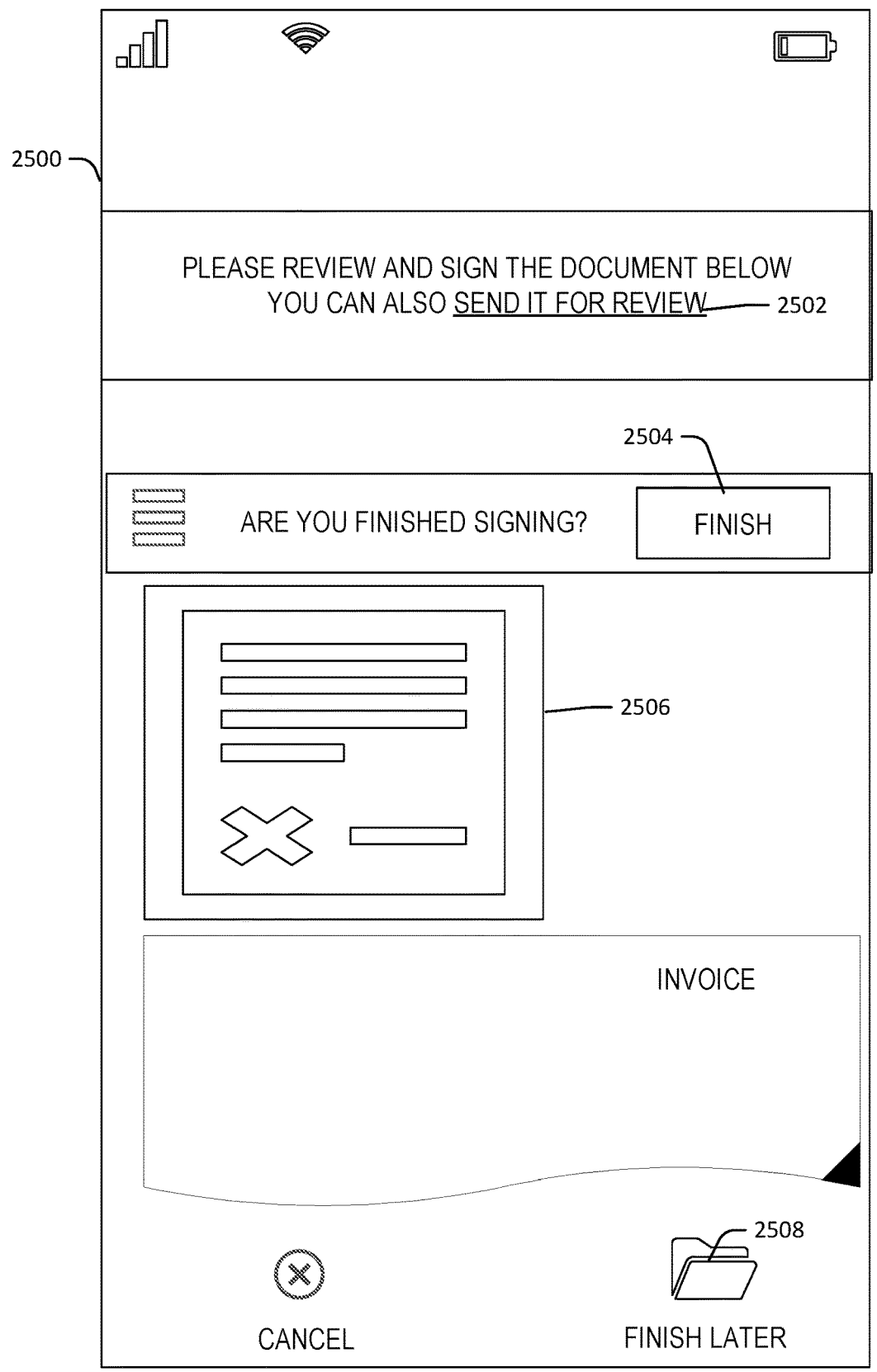
FIG. 25 illustrates a UI of a digital signature page, according to some examples of the present disclosure.

At operation 1004, the system may present the resource allocation offer to the first entity for review. This may be done in a user interface such as shown in FIG. 25. For example, system may allow a first entity to review the terms of the contract in either a summary form or in full detail. Further, at operation 1006 the system may further allow the first entity to export the complete digital contract into a word processing program for additional review offline. At operation 1008 the first entity may digitally sign the resource allocation offer.

The system may retain any unsigned contracts to await digital signing by the first entity. The system's algorithm may update and re-price any unsigned contracts daily based on changes in market interest rates. The system may further notify the first entity of any unsigned contracts when the first entity logs into the system. After a period of time, (e.g. 30 days) any unsigned contracts may expire, and the attached documents returned to the dashboard where the first entity may delete them or resubmit them through the processing phase.

Figure 26:
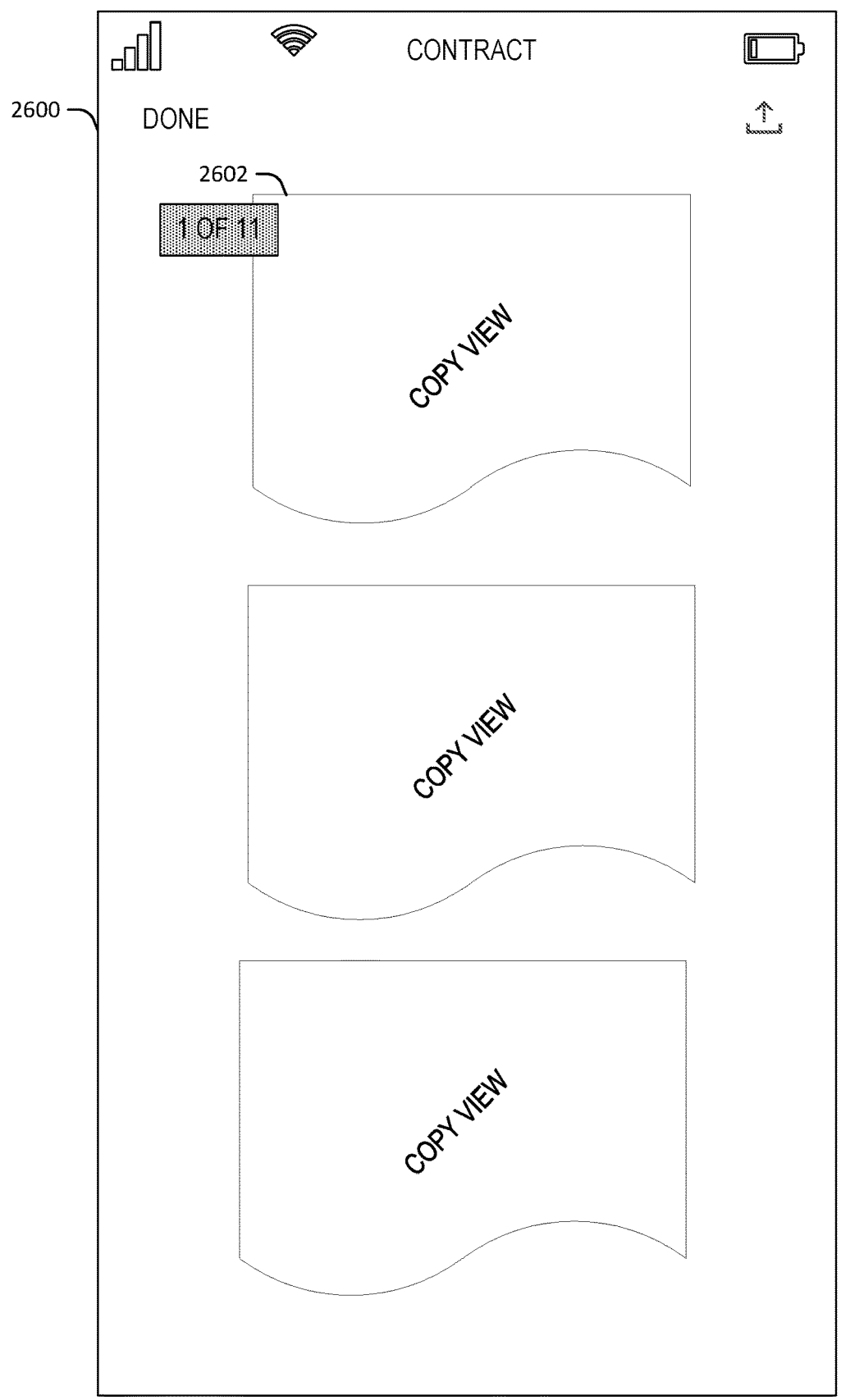
FIG. 26 illustrates a UI of a stored resource allocation offer document page, according to some examples of the present disclosure.

Once a first entity signs a contract, at operation 1010, the system may store a copy of the completed and executed resource allocation offer on a private blockchain database, with a hash on a public blockchain network (e.g. Ethereum), which will provide users and authorized third-parties (e.g. accountants, regulators, or auditors) with direct access to immutable copies of the documents, such as shown in FIG. 26.

Figure 11:
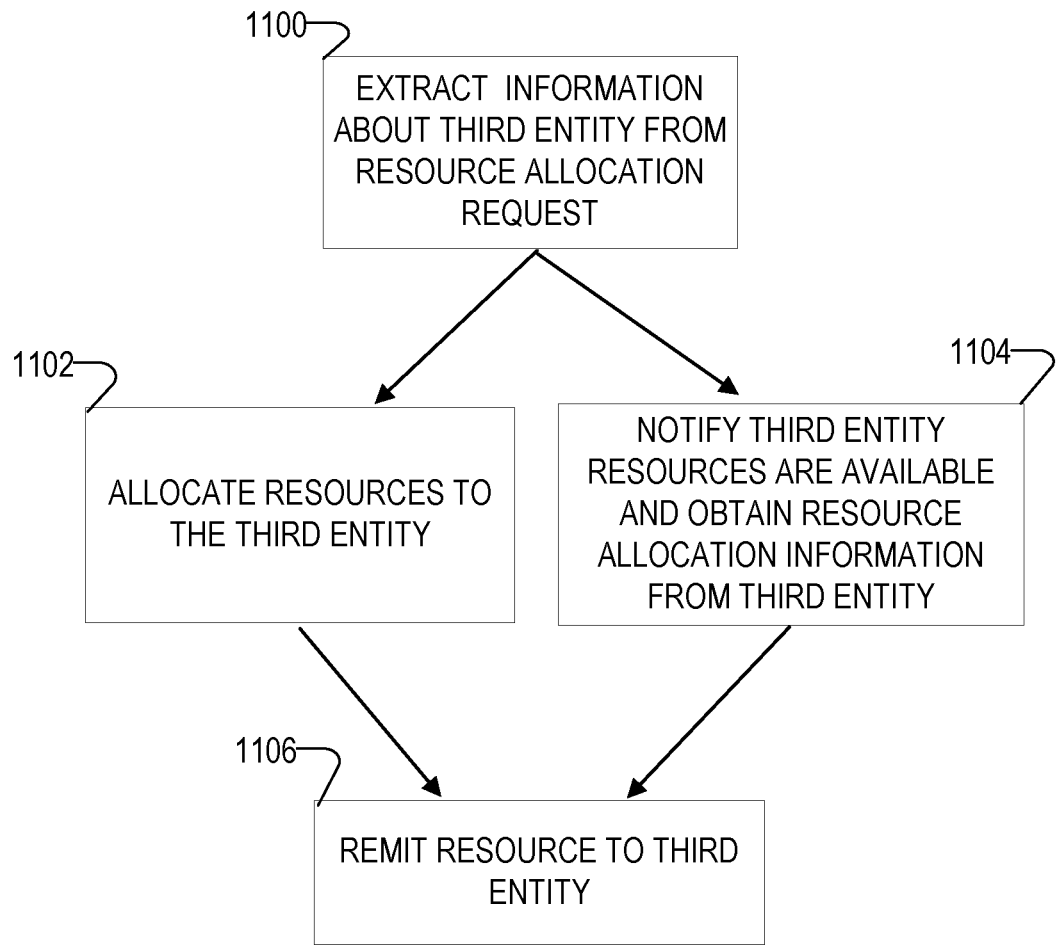
FIG. 11 illustrates a flow chart of a resource allocation phase for an accelerated resource allocation system, according to some examples of the present disclosure.

FIG. 11 illustrates a flow chart of a resource allocation phase for an accelerated resource allocation system according to some examples of the present disclosure. FIG. 11 is an example embodiment of resource allocation phase 412 of FIG. 4. At operation 1100, the system may extract information about a third entity from the resource allocation request. In an example, the third entity may be a vendor selling or renting equipment or material to the second entity. This may involve the system identifying the vendor information in an invoice or lease using OCR as described above for FIG. 8. This may happen automatically. For example, the system may recognize third entity information and automatically allocate resources (e.g. a check) at operation 1102 and send the resources to the third entity at operation 1106. In other examples, the system may utilize operation 1104 and notify the third entity that resources are available and obtain resource allocation information from the third entity. For example, the system may receive automatic deposit information from the vendor. In these examples, the vendor may be paid electronically.

Figure 12:
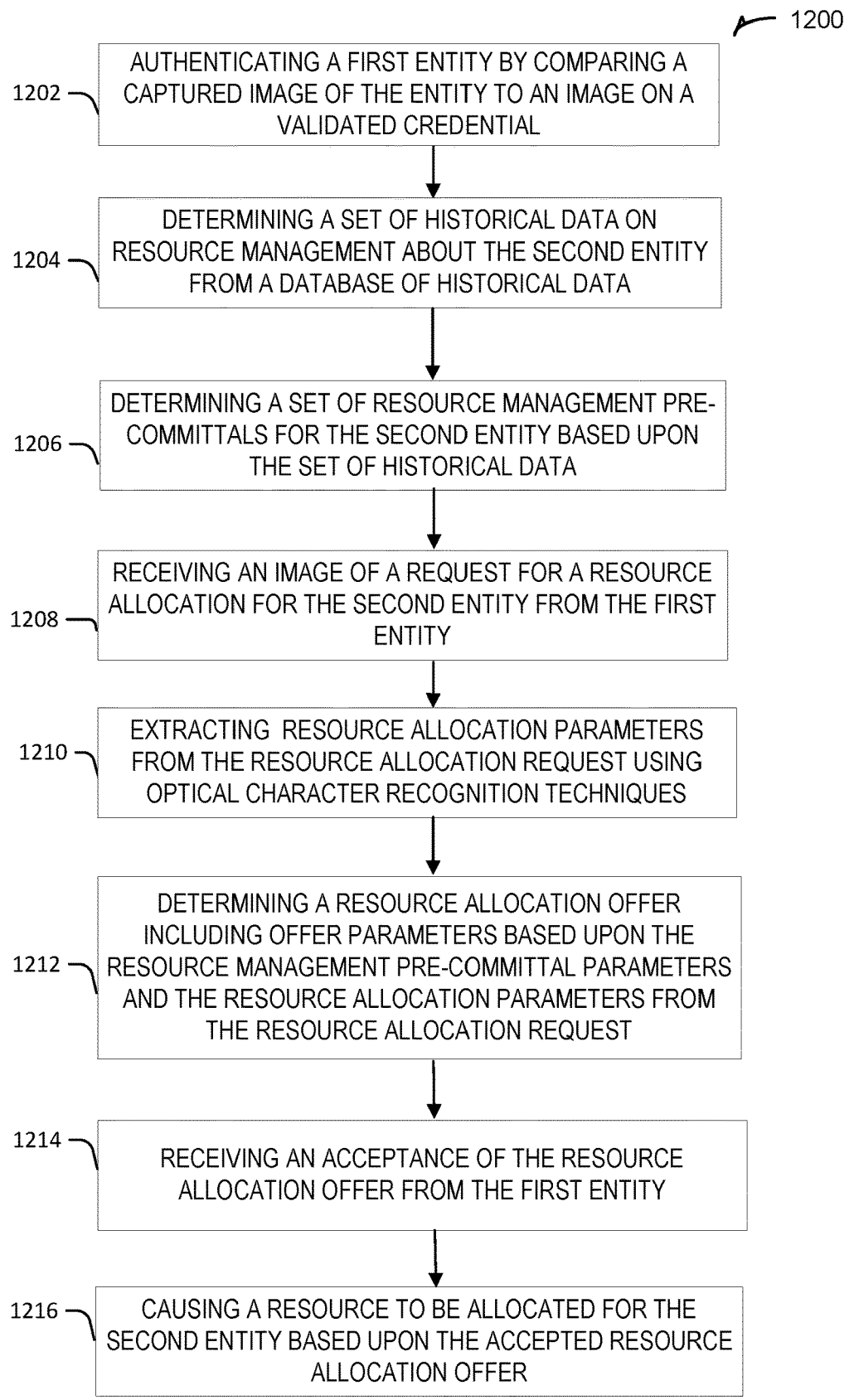
FIG. 12 illustrates a flow chart of a method for accelerated resource allocation, according to some examples of the present disclosure.

FIG. 12 illustrates a flow chart of a method for accelerated resource allocation according to some examples of the present disclosure. FIG. 12 shows one example method of the operations of FIGS. 4-11. Operation 1202 may include authenticating a first entity by comparing a captured image of the entity to an image on a validated credential. In an example the validated credential may be a government issued identification such as a driver's license or a state issued identification. In this example the government issued identification may contain a biometric (e.g. a photograph) of the first entity/user. The validity of the identification may be verified by the system confirming the barcode information of the identification with databases over a network. In another example the identification may include a military identification or a passport.

The first entity may be an individual (e.g. an agent or employee) of a second entity (e.g. a corporation, limited liability company, partnership, or other company or business organization) who has authority to act on behalf of the second entity (e.g. bind the second entity to a financial contract or agreement) and use the system. In some examples, authenticating the first entity may include authenticating the authority of the first entity to act on behalf of the second entity. The first entity may create a profile on the system, which may include identifying the second entity with which the first entity is affiliated.

In an example of operation 1202, the first entity's/user's identity may then be verified through comparing a captured biometric (e.g. facial identification) generated using the native capabilities of the first entity's device (e.g. mobile phone camera) with the biometric on the government issued identification. The captured image may also be a series of images requiring the first entity/user to "pose" at different angles to ensure that the captured image is of an actual person, and not a photograph.

As a part of operation 1202, the system may generate and forward over a network a digital authorization (e.g. a certificate of incumbency) to a second individual as described for FIG. 5 which attests that the second individual is an authorized representative of the organization and that the second individual attests that the first entity has authority to act on behalf of the organization.

At operation 1204 the system may determine a set of historical data on resource management about the second entity from a database of historical data. The historical data may include the credit data of the second entity obtained from one or more third-party data sources such as credit reporting agencies, social networking services, business databases (e.g., DUN AND BRADSTREET®), and the like. In some examples, the system may connect to the third-party data sources at operation over a network to get information regarding the organization regarding past resource allocations and other information (e.g., such as credit score, liens, judgments, revenue, years in business, number of employees, or paid indicators (how likely the organization is to pay on time)) which will be sent to the system over a network.

At operation 1206 the system may determine a set of resource management pre-committals for the second entity based upon the set of historical data obtained at operation 1204. The system may then process the information obtained from the third-party data sources using an algorithm (e.g., utilizing a set of rules, a linear function, a logistic regression function, or the like) to determine pre-committal parameters for the second entity, from which resource management pre-committals (such as an initial level of financing or an initial rate of interest) are determined for the organization.

In some examples, the system may perfect a lien on the equipment. For example, the system may, during the setup phase of the application, prompt the first entity/user to grant authority to allow the system to file a broad UCC lien against the second entity. For example, with the software licensing agreement—click-wrap. When the first entity finances a purchase, the system amends the broad lien with the specific transaction details. This allows the system to relate back to the broad UCC filing for a purchase money security interest in order to secure a first priority lien against the company. These liens may be accomplished through recording them in one or more electronic external databases.

Operation 1208 may include receiving an image of a request for a resource allocation for the second entity from the first entity. Once the first entity is verified and authorized to use the system, the first entity may import resource allocation requests to the system in a manner such as described for FIG. 7. This may include, for example, scanning or otherwise importing the resource allocation requests (e.g. invoices, rental agreements, purchase orders, or other similar documents) into the system using the camera of a smartphone or importing resource allocation requests through email.

Operation 1210 may include extracting resource allocation parameters from the resource allocation request using optical character recognition (OCR). The system may recognize a plurality of resource allocation parameters from an image of the resource allocation request. In some examples, the parameters may include price, vendor information, equipment information, quantity information, and the like. This analysis may be done through a combination of one or more of optical character recognition (OCR) and artificial intelligence (AI) processing of the documents.

Operation 1212 may consist of determining a resource allocation offer including parameters based upon the resource management pre-committal parameters and the resource allocation parameters from the resource allocation request. Responsive to the first entity selecting from various resource allocation parameters, the system may create a resource allocation offer (e.g. a financing contract) based on resource management pre-committals and resource allocation parameters from the resource allocation request. For example, automated digital contracts may be assembled, summarized, and presented to the first entity for digital signing. In this phase, the system may insert the correct pricing and financing information into a single, digital, fully integrated contract.

In another example, the system may allow the first entity to export the contract (such as to a word processing program) for offline review. In this example, the first entity may digitally sign the contract through the system at a later time. In another example, if the first entity has not digitally signed the resource allocation offer after a period of time, the system may cancel the offer and return the resource allocation requests to a different screen (such as a dashboard) where the first entity may delete the resource allocation requests or resubmit the resource allocation requests for a new resource allocation offer. In such an example, the terms of the new resource allocation offer may change (with respect to the initial resource allocation offer) should one or more resource allocation parameters or resource management pre-committals change from when the initial resource allocation offer was made. Such as, for example, changes in market rates, or changes in one or more items of the historical data regarding the company.

Operation 1214 may include receiving an acceptance of the resource allocation offer from the first entity. For example, the first entity may, after receiving the resource allocation offer, digitally sign the resource allocation offer. This may include the first entity executing a click-wrap agreement, by checking a box or clicking a link or a button or the like, which signals the first entity's assent to abide by the terms of the resource allocation offer. In another example, the first entity may use a biometric feature of a first entity device such as, for example, a fingerprint identification or facial recognition feature on a smartphone or tablet to "sign" the resource allocation offer. In another example, the system may present the first entity with a signature box in which the first entity may enter the first entity's signature, such as with the first entity's finger or using a stylus.

The system may use multiple means of capturing the assent of the first entity to the terms of the resource allocation offer. Such as, for example, through multi-factor authentication (MFA). For example, the system may require the first entity to execute a combination of "signing" methods as described above, such as the first entity executing a click-wrap agreement and submitting a biometric through the architecture of a user device. Or, as another example, the system may require the first entity to enter the first entity's signature in a signature box, and enter a code sent to the first entity through a text message, a telephone call, generated by an authenticator service, or the like.

Operation 1216 may include causing a resource to be allocated for the second entity based on the accepted resource allocation offer. For example, once the first entity signs and causes the resource allocation offer to be executed, the system may contact a third entity such as a vendor, to inform the vendor that resources (e.g. funds) are ready to be allocated on behalf of the second entity. In this example, the system may obtain from the third entity resource allocation information (e.g. a bank routing and account number) into which resources may be deposited. In another example, the system may cause a check to be generated and sent to the third entity. In these examples, the third entity may be a vendor, supplier, or the like selling or renting equipment to the second entity. The system may determine information regarding the vendor by extracting the resource allocation parameters from the resource allocation request, such as at operation 1210.

Figure 13:
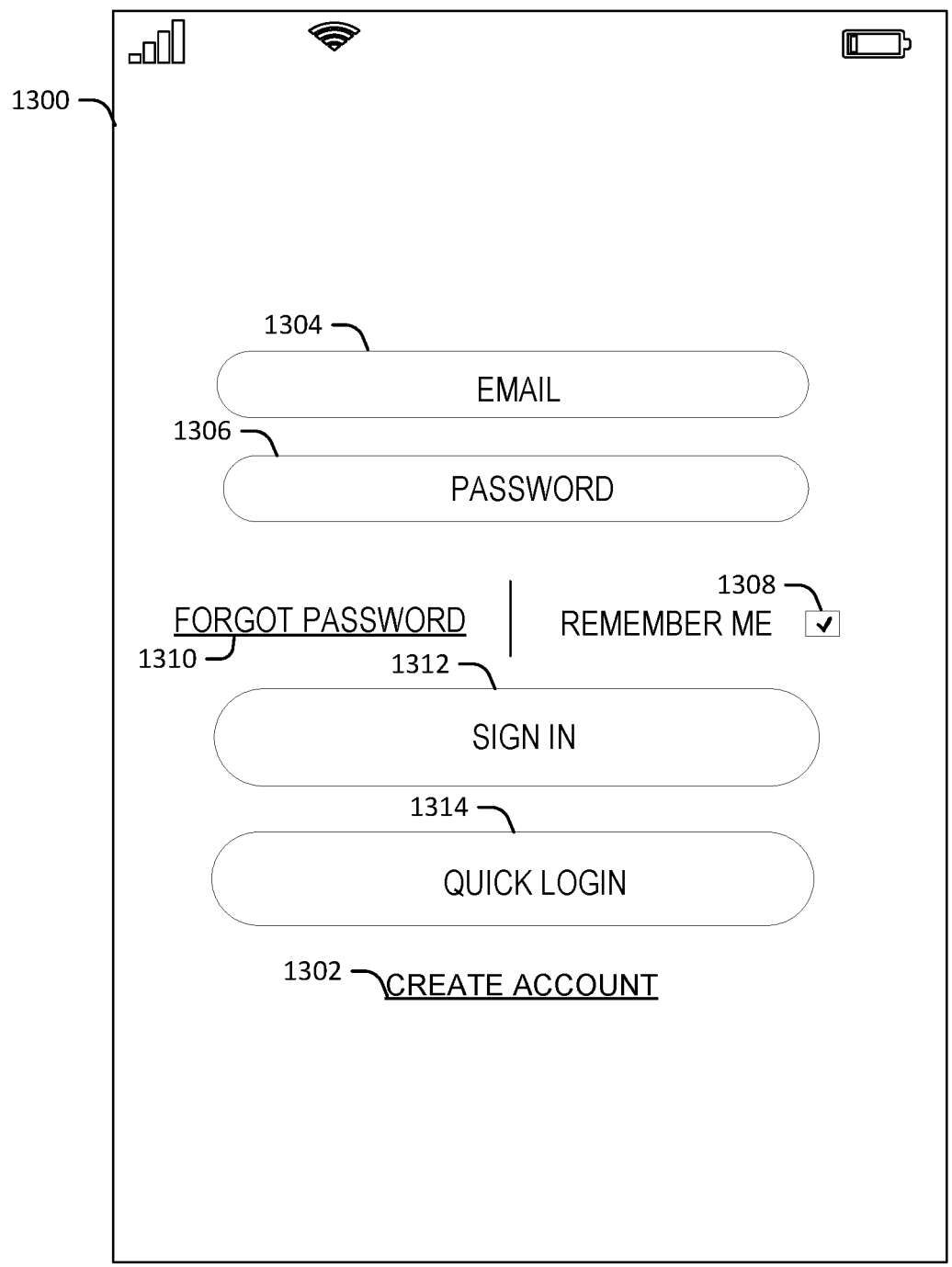
FIG. 13 illustrates a User Interface (UI) of a sign on page for the system, according to some examples of the present disclosure.

FIG. 13 illustrates a User Interface (UI) of a sign on page for the system according to some examples of the present disclosure. This is a screen that the first entity may see during the initial setup phase, or after an account is set up. In an example, the first entity may sign in with an email address and password, or using a quick login which may use a biometric verification (e.g. fingerprint scan, or facial identification) to log the first entity in. If the first entity has not yet created an account, the first entity may click the create account link 1302 and begin the setup process.

In an embodiment, once the first entity has successfully created an account, which may include entering an email address and creating a password, the first entity may enter his or her email address in the email field 1304 and the password he or she created in the password field 1306. In an example, the first entity has the option to enter biometric information of clicking a remember me checkbox 1308, which may save the first entity's email address on the login page 1300. The system may also allow a first entity to recover a lost or forgotten password by clicking a "forgot password" link 1310. In this example, the system may, in response to the first entity clicking the forgot password link 1310 send a link to reset the password to the first entity's email address. In another example, the system may generate a temporary password for the first entity and send the temporary password to the first entity, such as in an email, or by a text message or the like, and prompt the first entity to change the temporary password to a new password upon the first entity accessing the system with the temporary password.

Upon successful entry of a username and password and the first entity clicking a sign on button or link 1312, the system grants the first entity access to a dashboard, home screen or such similar screen. In another example the first entity may enter username and biometric information to gain access to the dashboard. In this example, the first entity may enter his or her email address, and click a button or a link, such as a quick login button 1314 which will prompt the first entity for the biometric, which may be obtained through a user device such as a smartphone, a tablet or the like.

Figure 14:
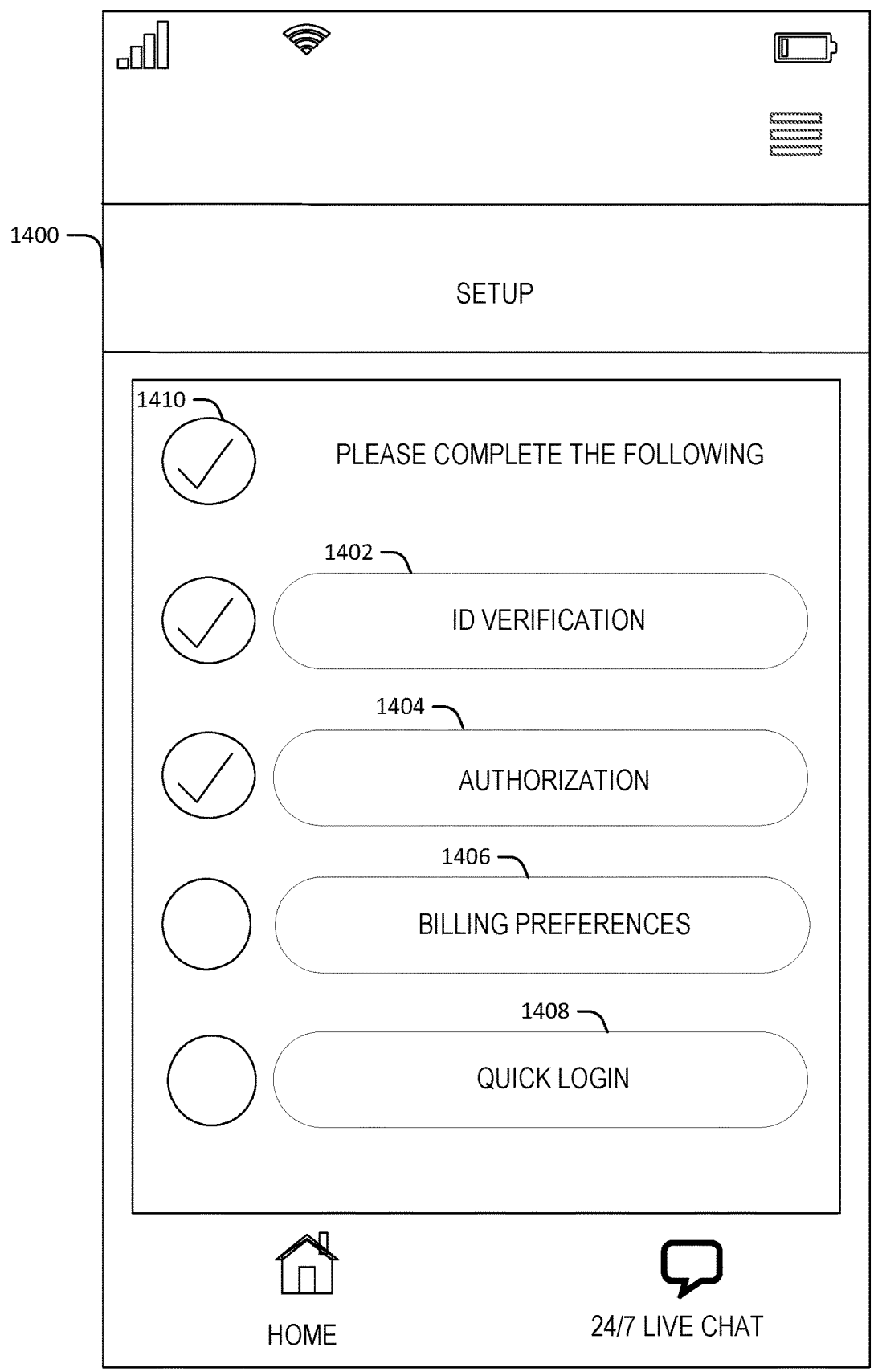
FIG. 14 illustrates a UI of a setup progress page, according to some examples of the present disclosure.

FIG. 14 illustrates a UI of a setup progress page 1400. In an example, the first entity may walk through numerous steps to set up their use of the system including an ID verification step 1402, and authorization step 1404, a billing preferences step 1406, and quick login step 1408. In the billing preferences step 1406, the first entity may be prompted to set up a method for how the second entity may be billed once an executed resource allocation agreement is complete. For example, the first entity may request that a paper bill may be sent to the second entity at the billing interval (e.g. monthly) called for by the terms of the resource allocation offer. In another example, the first entity may enter account information such as a bank routing and account number from which payments may be deducted at the billing interval.

At the quick login step 1408, the first entity may be prompted to select parameters to enable the quick login process. This may allow the first entity to access the system without requiring the first entity to enter a password each time. For example, using a biometric as described above. This may also include, for example, the first entity using multi-factor authentication as a means to log in. Such as, for example, entering a code received in a text message after clicking quick login 1314 on the login page 1300 as shown in FIG. 13. In an example, the quick login step 1408 on the setup screen 1400 may be an optional step.

Returning to the example of FIG. 14, the first entity may click a link corresponding to the step the first entity must complete. Once a step is complete the progress may be noticed with a check box 1410 next to the completed step. Once the first entity completes all required steps, the first entity may be returned to the login page 1300, and then able to access the system by logging in as described for FIG. 13. When the first entity fails to complete all steps of the setup process, or the system determines at any step that the first or second entities do not qualify for use of the system, for example, if the first entity's identification cannot be verified at the ID Verification step 1402, the system may block or otherwise not allow the first entity to log in.

FIG. 15 illustrates a UI of an identification scan page according to some examples of the present disclosure. In an example, after the first entity clicks on the ID verification link 1402 on the progress page 1400, the first entity may be taken to the identification scan page 1500. In an example of FIG. 15, the first entity may be instructed, such as through a set of instructions 1504 to scan the front and/or rear of the first entity's identification, such as by using a camera on a user device (e.g. a smartphone). On the identification scan page 1500, the system may include an area 1502 (e.g. a "window" or frame) in which the first entity is to orient the first entity's identification, such as to center the identification in the window 1502. In this example, the identification window 1502 may "pop up" making other features inaccessible (as denoted by the dashed lines in FIG. 15) while the identification window 1502 is active. In another example, the first entity may be instructed to similarly scan the reverse or back side of the first entity's identification. In another example, when the first entity completes scanning the identification, the first entity may be returned to the setup progress page 1400.

FIG. 16 illustrates a UI of a first entity (e.g. a user) authorization page according to some examples of the present disclosure. In an example, after clicking on the authorization step 1404 on the setup page 1400, the first entity may be taken to an authorization screen 1600. As a part of the setup phase, the first entity may look up the organization with which he or she is affiliated. In some examples, organization names are stored in a database created from publicly registered information (e.g. email domain registration). Once a verified organization is selected, the first entity may be presented with the authorization screen 1600 where the first entity may be presented with a field 1604 in which the first entity enters the name and email address of a verifier (e.g. executive, officer, director, vice president, or president) with the second entity who can verify the user has the authority to bind the second entity to financial transactions. In an embodiment, the email address must be on the same email domain as in the publicly registered information for the organization.

In an example, the system then generates and forwards, over a network, an authorization (e.g. a certificate of incumbency) to the verifier which attests that the first entity has authority to act on behalf of the organization, once the verifier digitally signs the authorization acknowledging the first entity's authority to bind or act on behalf of the organization, the system authorizes the first entity.

FIG. 17 illustrates a UI of a resource allocation request import (e.g. a document upload) page according to some examples of the present disclosure. In an embodiment, after a verified first entity logs into the system the first entity may add (e.g. upload) invoices by accessing the document upload screen 1700. In the import phase, the first entity may choose from a plurality of upload options. For example, in one embodiment the first entity may scan the document for example, by selecting image capture 1702 using the camera of a mobile or handheld device (e.g. a smartphone or tablet). In another embodiment, the first entity may select upload invoices 1706 which may import a file from a location (e.g. a cloud-based database, a computer hard drive, or a flash drive). In another embodiment the first entity may upload documents using email import such as by selecting copy address 1704.

Figure 18:
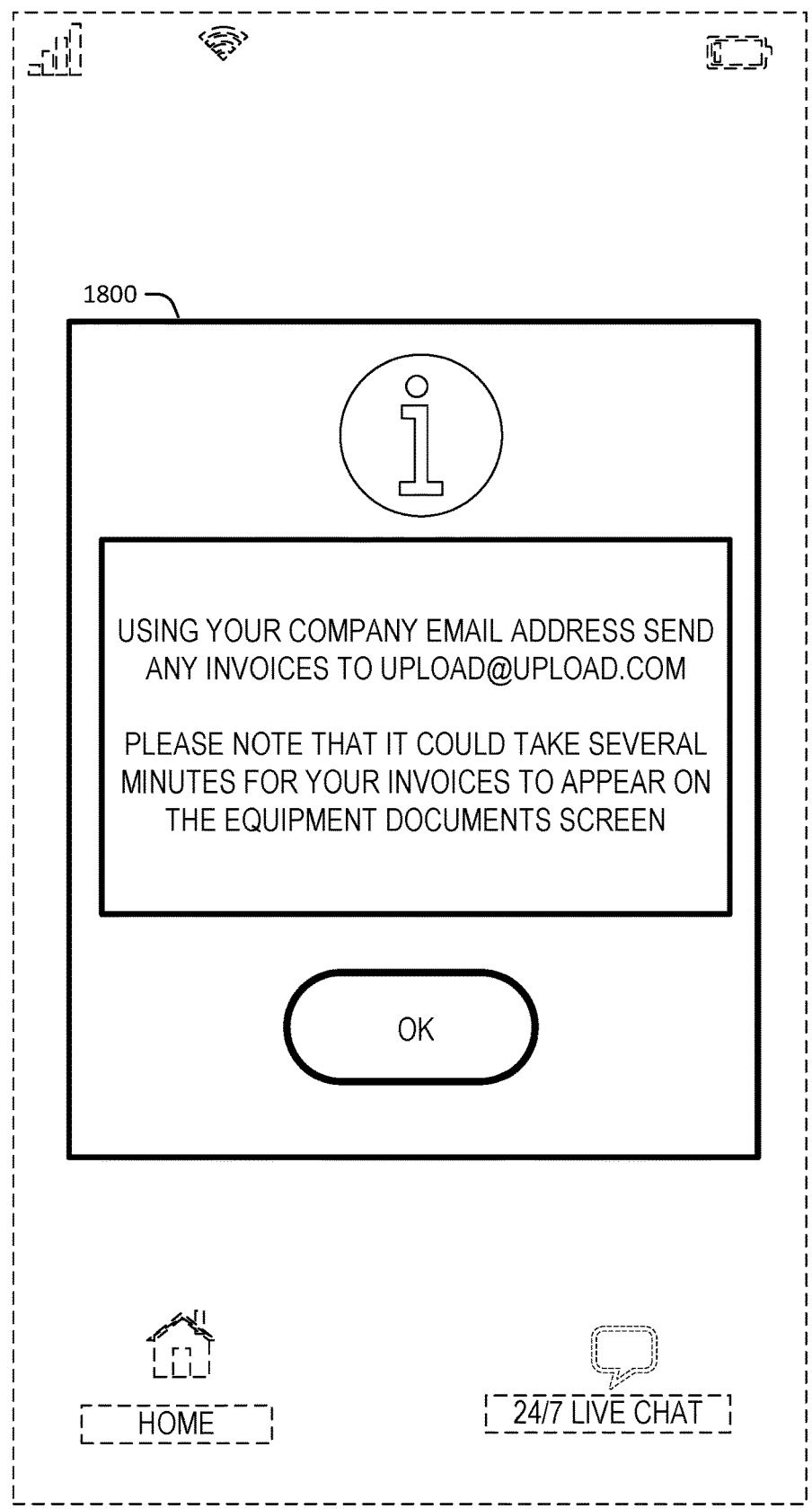
FIG. 18 illustrates a UI of an email import page, according to some examples of the present disclosure.

FIG. 18 illustrates a UI of an email import page according to some examples of the present disclosure. In an embodiment, when the first entity selects to upload invoices via email by selecting copy address 1704 on the document upload page 1700, the first entity may be taken to an information page 1800 for email import. This page may instruct the first entity how to import the documents through email and notify the first entity that it may take several minutes for the documents to appear in the system. In this example, the information page 1800 may "pop up" making other features inaccessible (as denoted by the dashed lines in FIG. 18) while the information page 1800 is active. The email is received by the system and processed the same way as an image.

Figure 19:
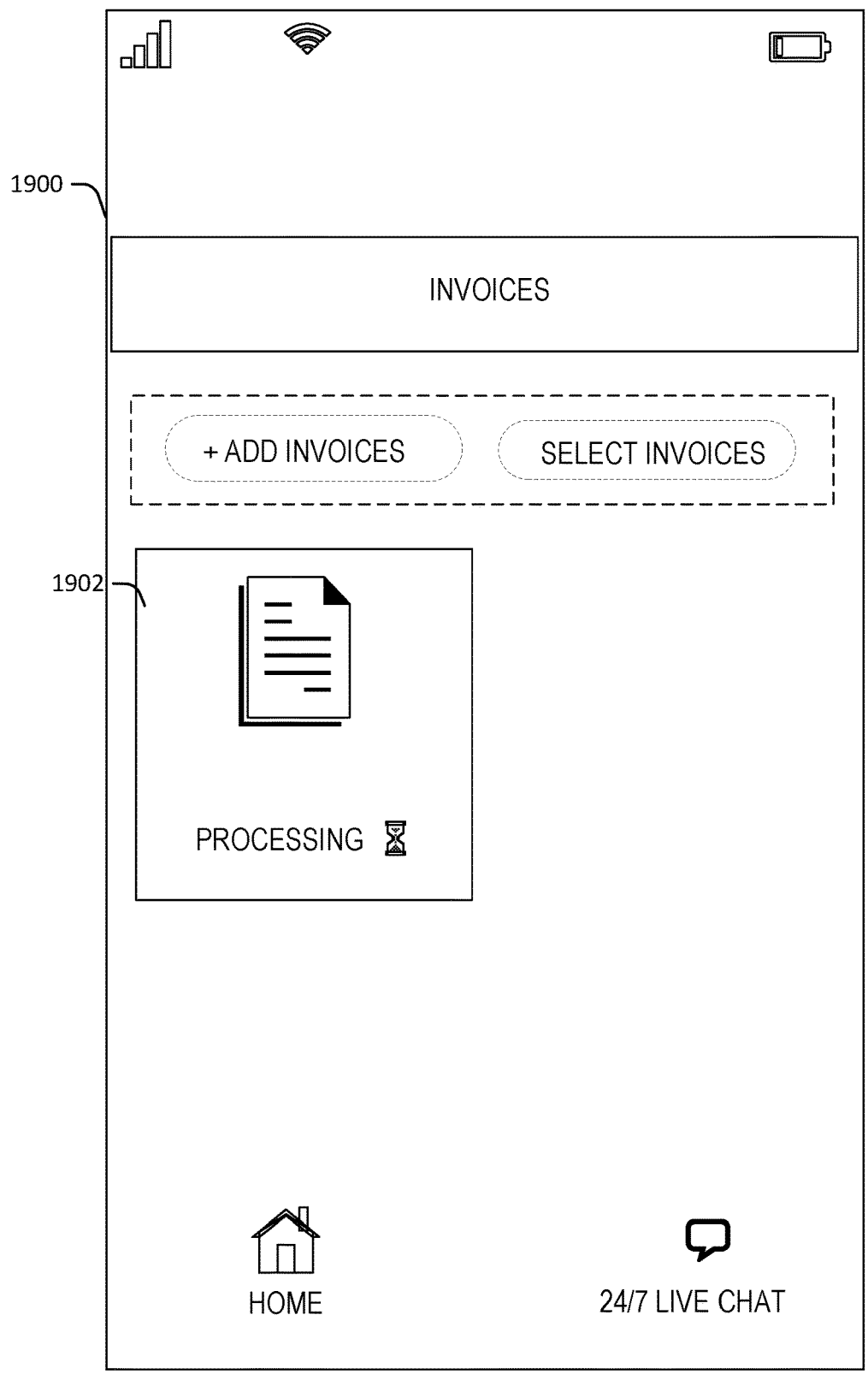
FIG. 19 illustrates a UI of a resource allocation request processing page, according to some examples of the present disclosure.

FIG. 19 illustrates a UI of a resource allocation request (invoice) processing page according to some examples of the present disclosure. Once the documents are imported into the system the documents may be saved to the system's dashboard or desktop as shown in FIG. 22. The first entity may then select a desired invoice or invoices on the invoice processing page 1900 for processing 1902. In an embodiment, the system's processing circuitry may process the document using one or more automated processes. For example, the system may apply one or more optical character recognition (OCR) processes to a captured image of the document. The OCR may produce one or more-character strings that represent the text shown in the image. In some examples, the OCR process may utilize one or more machine-learning models (e.g., a model created through supervised or unsupervised learning). The character strings may be processed to produce one or more transaction parameters, such as a vendor name, vendor contact details, transaction amount, and the like. In some examples, the system may utilize a natural language processing algorithm. This processing may be done by the system or may be done by one or more processing services that are reachable by a network. For example, rather than processing the image of the invoice itself, the system may send the invoice image to a third-party service to process the image.

In another example, the system may, using its processing circuitry and instructions executed by at least one non-transitory machine-readable media, read, process, and present to the first entity the transaction parameters (e.g. vendor information and dollar amount). The system may recognize a plurality of fields from an image of an invoice (e.g. price and vendor identifier). This analysis may be done through a combination of one or more of optical recognition and artificial intelligence (AI) processing of the documents.

Figure 20:
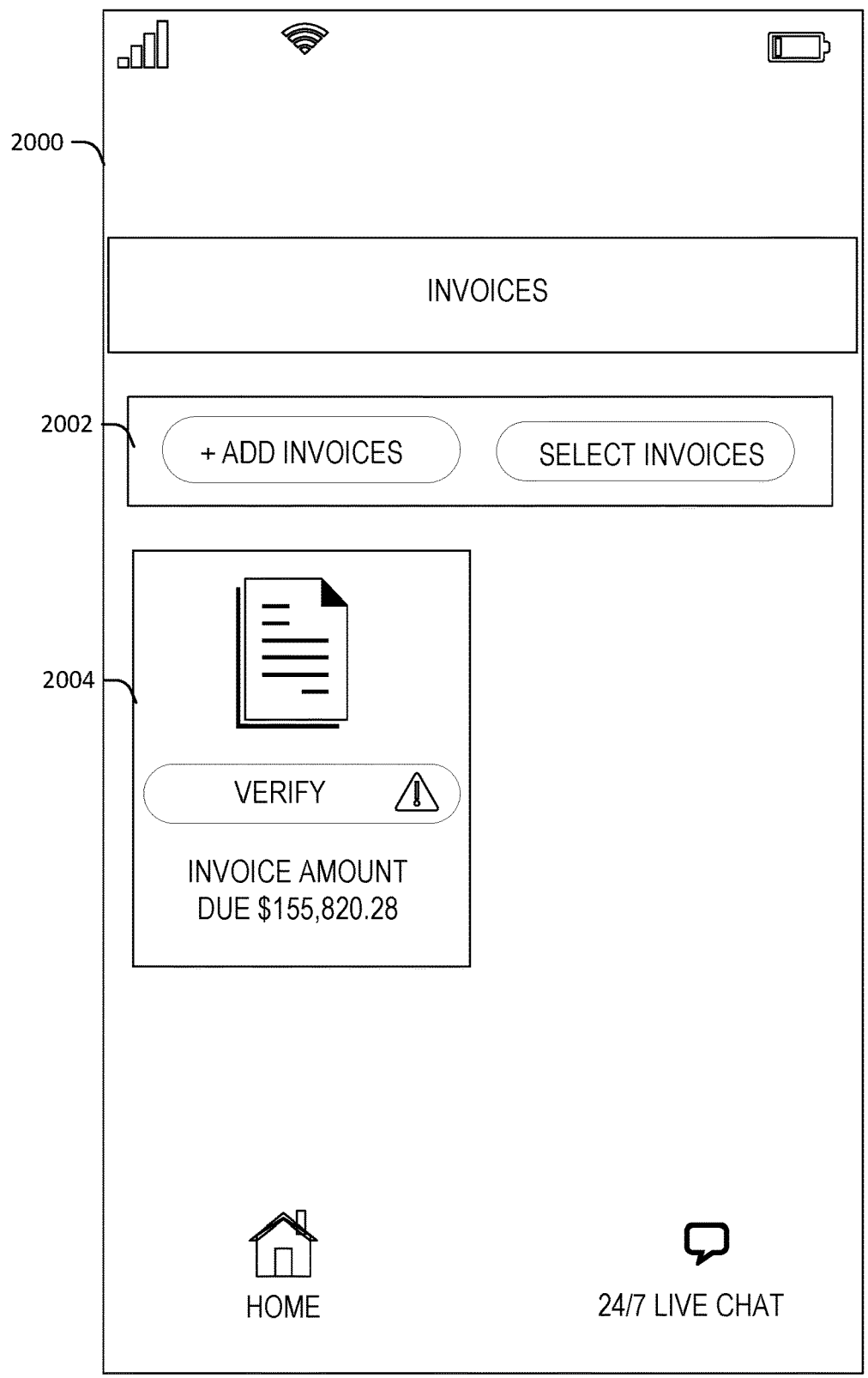
FIG. 20 illustrates a UI of a resource allocation request verification page, according to some examples of the present disclosure.

FIG. 20 illustrates a UI of a resource allocation request (e.g., an invoice) verification page according to some examples of the present disclosure. In an embodiment, once the invoice is processed, the system may proceed to a verification page 2000. This page may require the first entity to verify the transaction details for a processed invoice 2004 or invoices which have been processed as described for FIG. 19. The first entity may also select additional invoices for processing by clicking an add invoice button 2002. In this example, the first entity may be taken back to the processing screen 1900 while the system processes the added invoice. The example of FIG. 20 shows a single invoice, but the page 2000 may include all invoices which have been processed to have the details of the transaction for a selected invoice verified.

Figure 21:
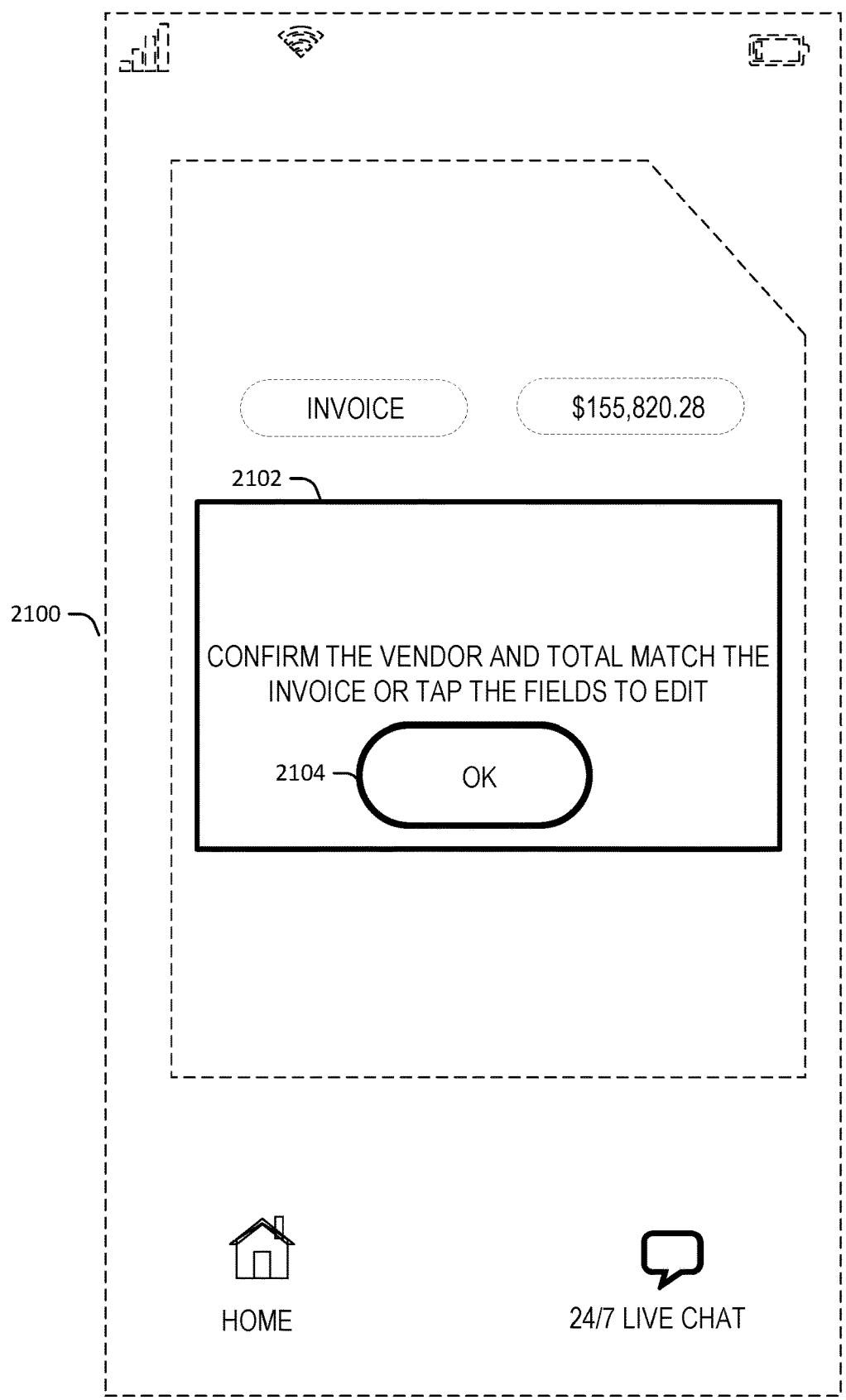
FIG. 21 illustrates a UI of a resource allocation request details confirmation page, according to some examples of the present disclosure.

FIG. 21 illustrates a UI of a resource allocation request (e.g. an invoice) details confirmation page according to some examples of the present disclosure. In the example of FIG. 21, responsive to the first entity selecting an invoice on the invoice verification screen 2000, the first entity may be taken to a screen 2100, in which a message 2102 is displayed, such as in a pop up, instructing the first entity to confirm the vendor and total match the information in the invoice. In such an example, after acknowledging the message 2102 by selecting OK 2104, the first entity may be taken to a details screen (not shown) in which the terms of the invoice may be displayed in fields which the first entity may edit.

In some examples, the system may learn to more effectively analyze the details of transactions based on any changes a first entity makes at this step. This may be done through an algorithm run by the processing circuitry (e.g. boosting) to automatically adapt based on changes a first entity enters. In some examples, the image is used, along with the corrections indicated by the first entity to retrain or refine the natural language processing model and/or the optical character recognition model (depending on which component was in error). For example, the first entity may indicate that while the system correctly recognized the proper field from the invoice, the recognized value was wrong. For example, that the invoice amount was wrong. This feedback may be used to refine the optical character recognition model by submitting the image of the invoice along with a label indicating a correct amount as additional training data in a supervised learning process. In other examples, if the first entity indicates that the system chose the wrong field for a transaction parameter (e.g., chose the zip code of the vendor as the amount), then that feedback may be used, along with the OCR results as training data to a supervised learning algorithm of the NLP process to refine or update a machine-learned model of the NLP process.

FIG. 22 illustrates a UI of an imported resource allocation request (e.g. an imported documents) dashboard. Once documents are imported into the system as a part of the import phase (as discussed above), they may be kept on a dashboard 2200 until selected by the first entity for processing. The dashboard 2200 may allow the first entity to select 2222 a particular one or ones of invoices 2204-2220 on the dashboard 2200 and submit them for processing (as discussed above). The dashboard 2200 may also have a search box 2202 which may allow the first entity to search available invoices 2204-2220 for a particular keyword (e.g. vendor name).

FIG. 23 illustrates a UI of a resource allocation (e.g. a project) detail page that may be presented to the first entity, which shows the total amount to finance 2302, allows the first entity to view the details of the transaction to be financed 2204, and allow the first entity to select the finance structure 2206 according to some examples of the present disclosure. This user interface may be presented to the first entity after confirming the details of a resource allocation request as described above for FIG. 21, or after selecting one or more imported resource allocation requests as described for FIG. 22. For example, the first entity may select between renting 2208 and financing 2210 the equipment and select from pre-set duration options 2212.

In the example of FIG. 23, the system may present a plurality of determined resource allocation options to the first entity based on the pre-committal (e.g., pre-approval) parameters according to some examples of the present disclosure. They first entity may select individual or various combinations of resource allocation requests (e.g. invoices) imported into the system for a term duration (e.g. 24, 36, 48, or 60 months) for a structure or structures (e.g. current lease or loan, or short-term, variable or fixed rate financing). The first entity may choose the inter-dependent offer parameters for the particular transaction, and the system may generate a resource allocation offer or offers based on the terms selected. The system may also allow the first entity to request custom options for the transaction.

Figure 24:
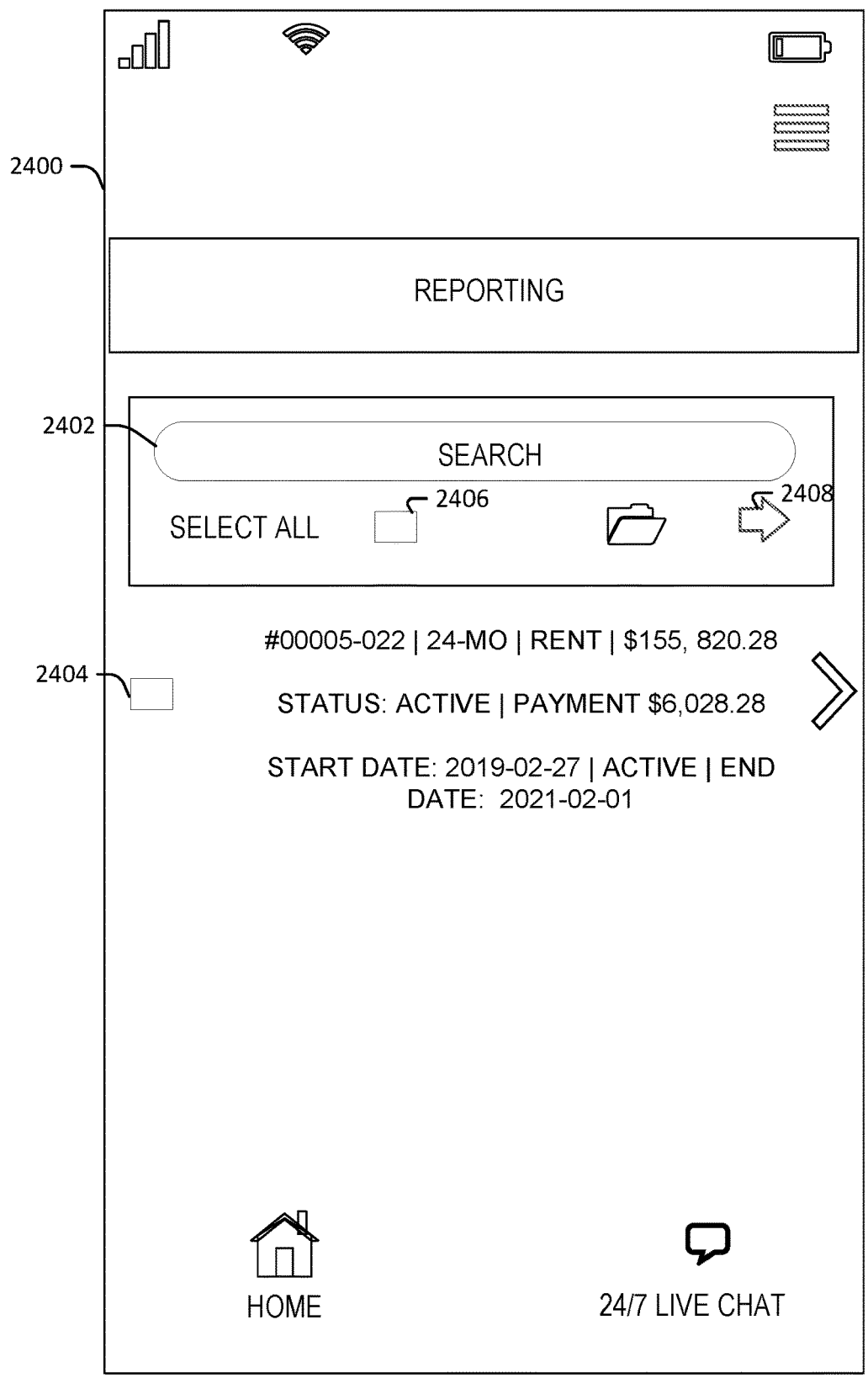
FIG. 24 illustrates a UI of a reporting page, according to some examples of the present disclosure.

FIG. 24 illustrates a reporting page according to some examples of the present disclosure. Responsive to the first entity selecting terms on the project detail page 2300, any transactions ready to be incorporated into a resource allocation offer may be listed on a reporting page 2400. The reporting page 2400 may allow the first entity to search 2402 particular transactions. The first entity may also be able to select a particular transaction by selecting a check box 2404. If more than one transaction is available, the first entity may be able to select multiple transactions by clicking the check box 2404 corresponding to the particular transaction, or by selecting select all 2406. Once the first entity has selected the transactions from which to create a resource allocation agreement, the first entity may select an arrow 2408 to advance to a step in which a resource allocation offer is generated and presented for digital signature.

FIG. 25 illustrates a digital signature page according to some examples of the present disclosure. On the digital signature page 2500, the first entity may be presented with a resource allocation agreement 2506 for the first entity to review. The system may allow the first entity to digitally sign the contract immediately or send the document for review 2502. If the first entity selected to send the document for review 2502, the system may export the document (e.g. to a word processing program) so the first entity may review the terms of the document offline.

In an example, the system may allow the first entity to save the project for later by selecting an icon 2508 on the digital signature page 2500. The system may retain any unsigned contracts to await digital signing by the first entity. The system may update and re-price any unsigned contracts daily based on changes in market interest rates. The system may further notify the first entity of any unsigned contracts when the first entity logs into the system. Whether the first entity decides to save the project for later or not, the first entity may digitally sign the contract to finalize the process by selecting finish 2504.

Responsive to selecting finish 2504, the first entity may be prompted to execute a click-wrap agreement, by checking a box or clicking a link or a button or the like, which signals the first entity's assent to abide by the terms of the resource allocation offer. In another example, the first entity may use a biometric feature of a first entity device such as, for example, a fingerprint identification or facial recognition feature on a smartphone or tablet to "sign" the resource allocation offer. In another example, the system may present the first entity with a signature box in which the first entity may enter the first entity's signature, such as with the first entity's finger or using a stylus.

The system may use multiple means of capturing the assent of the first entity to the terms of the resource allocation offer. For example, the system may require the first entity to execute a combination of "signing" methods as described above, such as the first entity executing a click-wrap agreement and submitting a biometric through the architecture of a user device. Or, as another example, the system may require the first entity to enter the first entity's signature in a signature box, and enter a code sent to the first entity through a text message, a telephone call, generated by an authenticator service, or the like.

FIG. 26 illustrates a stored document page according to some examples of the present disclosure. In an embodiment, once a first entity digitally signs the documents, they are stored in a database which can be accessed through the system. The first entity may see a listing of any active transactions and the payment amount for the transactions. When the first entity selects an agreement, the first entity may be taken to a stored document page 2600 for that agreement. The first entity may then review details of a transaction or display a copy 2602 of the entire contract. In an embodiment, the system may record a copy of the completed and executed agreement 2602 on a private database. In some examples, the private database may be organized as a blockchain. In some examples, the contract may be hashed, and the hash may be stored on a public blockchain network (e.g. Ethereum), which will provide users and authorized third-parties (e.g. accountants, regulators, or auditors) with direct access to the documents. Storing the hash of the contract on a public database makes the contract immutable. In some examples, the contract may include identity verification information of the first entity making the contract, payment details (e.g., confirmation that payment was made), financing terms, financing conditions, signature information, and the like. By storing this information on a private database (e.g., a private blockchain) and then storing a hash (a mathematical function that maps data of arbitrary size onto data of a fixed size) value of that contract, the system may have additional assurances that the contract has not been modified. In some examples, the hash may be a secure hash algorithm SHA-1, MD5, RIPEMD-128/160 or similar hash function.

Throughout the as-filed disclosure the term resource allocation may include loan financing, such as commercial loan financing for equipment lease or purchase or other similar financing. A resource pre-committal may include financing pre-approval for the second entity. Resource allocation limits may include credit limits, term limits, rate modifiers (e.g. interest rate modifiers) and the like. Historical data on resource management may include past resource allocation data (e.g. credit history) of the second entity or other similar information regarding the second entity such as one or more credit scores, liens, judgments, revenue, years in business, number of employees, paid indicators, or the like. A resource allocation request may include a document such as an invoice or other similar billing document for the purchase or lease of equipment. Transaction parameters from an image of a resource allocation request may include price, vendor information, equipment information, quantity information, or other similar information regarding the transaction. Resource allocation parameters may include key characteristics of a transaction such as dollar amount (including a total amount to be financed, which may include price information from a combination of resource allocation requests), vendor information or the like. Resource allocation offer may include a digital contract which include parameters based on the resource pre-committals and the resource allocation parameters from the resource allocation request. Inter-dependent offer parameters may include loan term or duration, financing type (e.g. purchase or rental), interest rate, or the like. A first entity may be a user of the system, authorized the bind a second entity to financial agreements (such as an executive, employee, agent, or other similar affiliated person or individual). The second entity may be a business, company, corporation, limited liability company, partnership, joint venture, or other similar organization the first entity is affiliated with.

Figure 27:
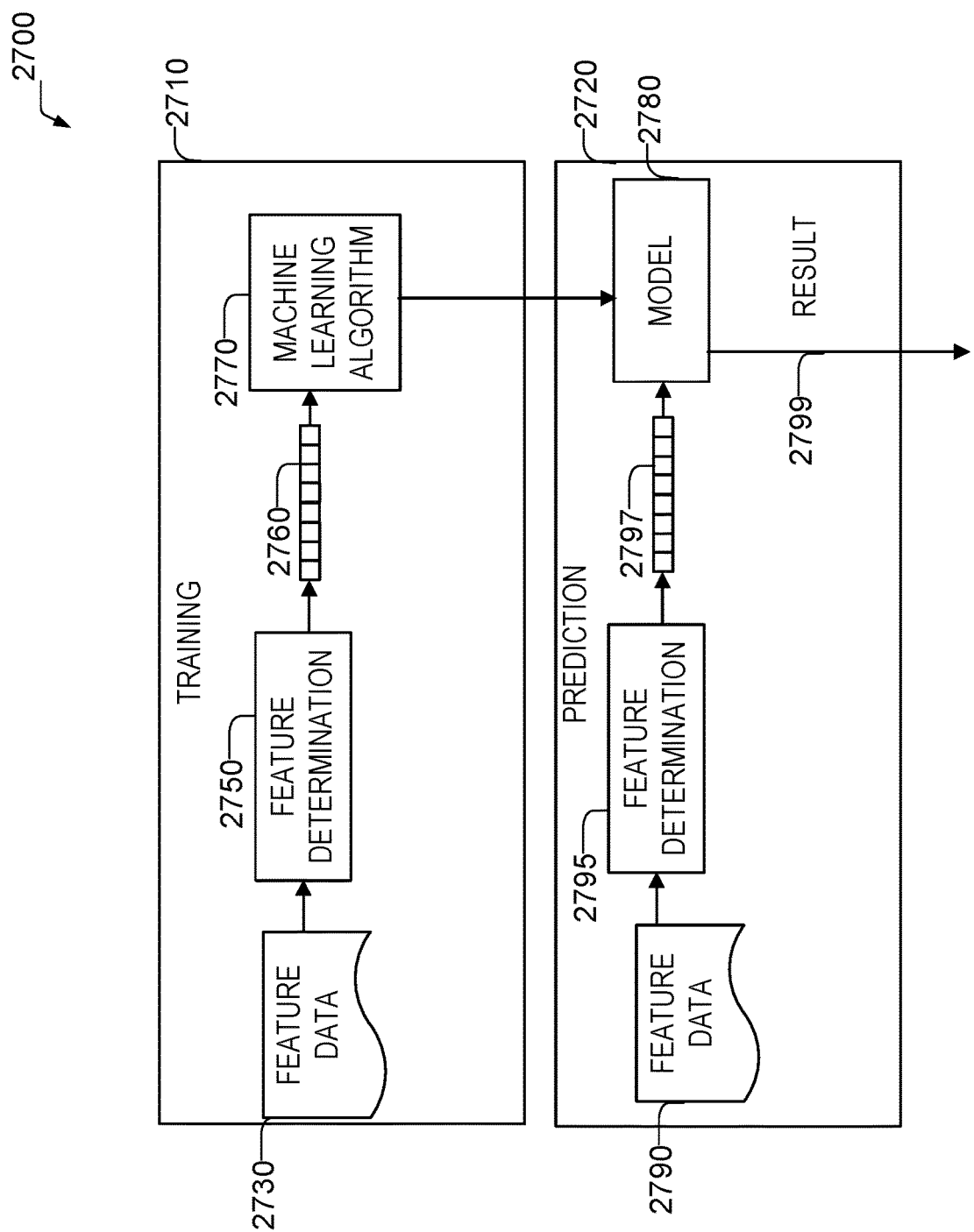
FIG. 27 illustrates an example of a machine learning module, according to some examples of the present disclosure.

FIG. 27 shows an example machine learning module 2700 according to some examples of the present disclosure. Machine learning module 2700 utilizes a training module 2710 and a prediction module 2720. Training module 2710 feeds training feature data information 2730 into feature determination module 2750. Feature data 2730 may be labelled or unlabeled. Feature determination module 2750 determines one or more features 2760 from this information. Features 2760 are a subset of the information input and is information determined to be predictive of a desired result. The machine learning algorithm 2770 produces a model 2780 based upon the features 2760 and in some examples, the model 2780 is refined based upon feedback associated with those features.

In the prediction module 2720, feature data 2790 may be input to the feature determination module 2795. Feature determination module 2795 may determine the same set of features or a different set of features as feature determination module 2750. In some examples, feature determination module 2795 and 2750 are the same module. Feature determination module 2795 produces features 2797, which are input into the model 2780 to generate a result 2799. The training module 2710 may operate in an offline manner to train the score model 2780. The prediction module 2720, however, may be designed to operate in an online manner. It should be noted that the score model 2780 may be periodically updated via additional training and/or user feedback.

The machine learning algorithm 2770 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, and hidden Markov models. Examples of unsupervised learning algorithms include expectation-maximization algorithms, vector quantization, and information bottleneck method.

In some examples, the machine learning module 2700 may be used to predict transaction parameters from OCR'd text. In these examples, the feature data 2730 and 2790 may include phrases such as "Total Due" before price, or "vendor" before a name. The result 2799 comprises a predictive set of resource allocation transaction parameters which may include price, vendor information, equipment information, quantity information, or the like.

Similarly, in some examples, the machine learning module 2700 may be used to predict the second entity's likelihood of timely payment. In these examples, the feature data 2730 and 2790 may include past resource allocation data (e.g. credit history) or other information regarding the second entity (e.g. credit scores, liens, judgments, revenue, years in business, paid indicators or the like). The result 2799 comprises pre-committal parameters which may be used to determine a set of resource management pre-committals. In some examples, the pre-committal parameters may be one or more scores.

Figure 28:
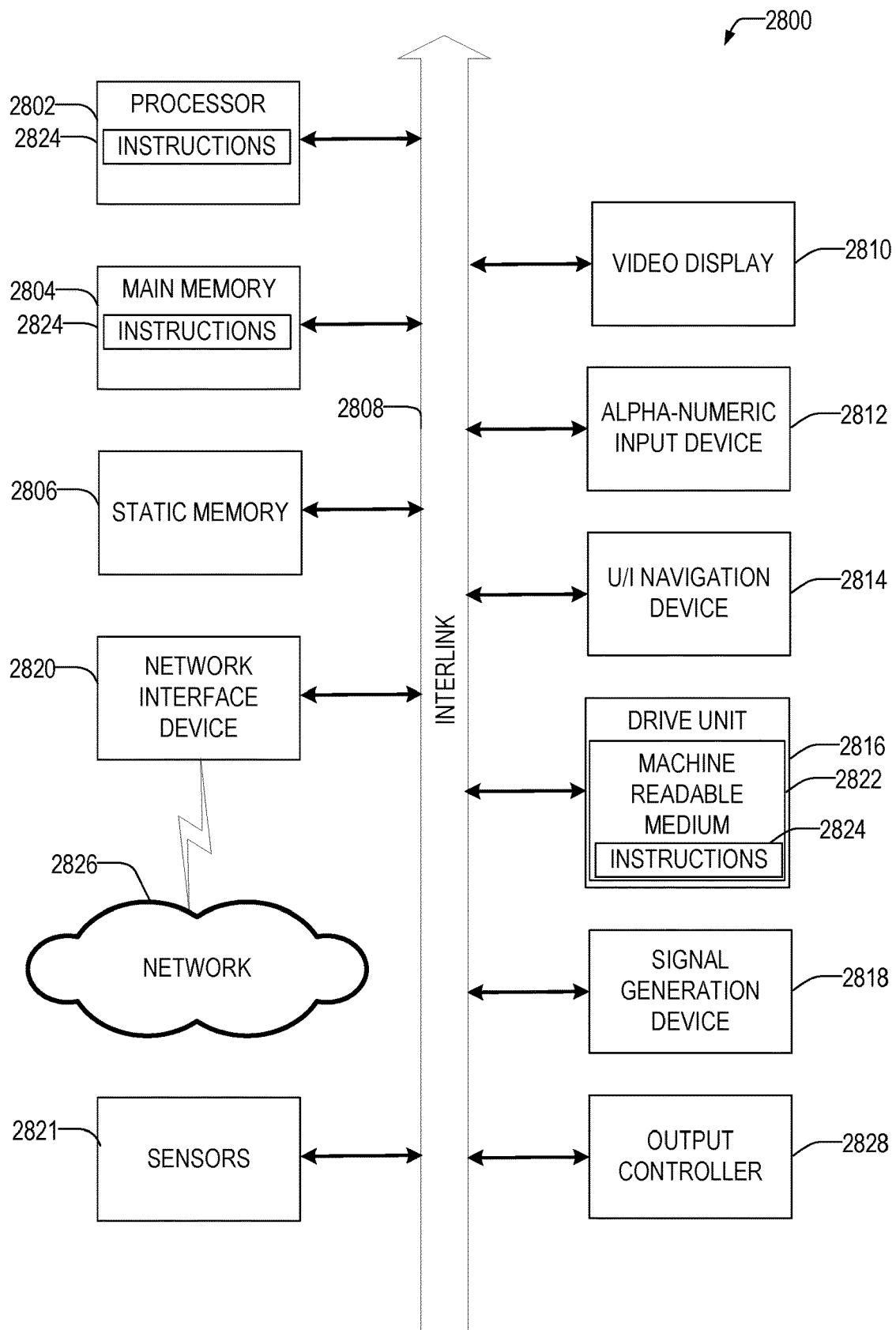
FIG. 28 illustrates generally an example of a block diagram of a machine upon which any one or more of the techniques discussed herein may perform, according to some examples of the present disclosure.

FIG. 28 illustrates a block diagram of an example machine 2800 upon which any one or more of the techniques (e.g., methodologies) discussed herein may perform. In alternative embodiments, the machine 2800 may operate as a standalone device or may be connected (e.g., networked) to other machines. In a networked deployment, the machine 2100 may operate in the capacity of a server machine, a client machine, or both in server-client network environments. In an example, the machine 2800 may act as a peer machine in peer-to-peer (P2P) (or other distributed) network environment. The machine 2800 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify commands to be taken by that machine. Machine 2800 may implement the GUIs of FIGS. 13-25 and implement the process of FIG. 12 and any process described herein. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 2800 may include a hardware processor 2802 (e.g., a central processing unit (CPU), a graphics processing unit (GPU), a hardware processor core, or any combination thereof), a main memory 2804 and a static memory 2806, some or all of which may communicate with each other via an interlink (e.g., bus) 2808. The machine 2800 may further include a display unit 2810, an alphanumeric input device 2812 (e.g., a keyboard), and a user interface (UI) navigation device 2814 (e.g., a mouse). In an example, the display unit 2810, input device 2812 and UI navigation device 2814 may be a touch screen display. The machine 2800 may additionally include a storage device (e.g., drive unit) 2816, a signal generation device 2818 (e.g., a speaker), a network interface device 2820, and one or more sensors 2821, such as a global positioning system (GPS) sensor, compass, accelerometer, or other sensor. The machine 2800 may include an output controller 2828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2816 may include a machine readable medium 2822 on which is stored one or more sets of data structures or instructions 2824 (e.g., software) embodying or utilized by any one or more of the techniques or functions described herein. The instructions 2824 may also reside, completely or at least partially, within the main memory 2804, within static memory 2806, or within the hardware processor 2802 during execution thereof by the machine 2800. In an example, one or any combination of the hardware processor 2802, the main memory 2804, the static memory 2806, or the storage device 2816 may constitute machine readable media.

The system may, using its processing circuitry and instructions executed by at least one non-transitory machine-readable media, implement any of the methods or phases, such as those described, for example, for FIGS. 1-12 above, or any other methods or phases described herein.

While the machine readable medium 2822 is illustrated as a single medium, the term "machine readable medium" may include a single medium or multiple media (e.g., a centralized or distributed database, and/or associated caches and servers) configured to store the one or more instructions 2824.

The term "machine readable medium" may include any medium that is capable of storing, encoding, or carrying instructions for execution by the machine 2800 and that cause the machine 2800 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 2824 may further be transmitted or received over a communications network 2826 using a transmission medium via the network interface device 2820. The Machine 2800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2820 may include one or more physical jacks (e.g., Ethernet, coaxial, or phone jacks) or one or more antennas to connect to the communications network 2826. In an example, the network interface device 2820 may include a plurality of antennas to wirelessly communicate using at least one of single-input multiple-output (SIMO), multiple-input multiple-output (MIMO), or multiple-input single-output (MISO) techniques. In some examples, the network interface device 2820 may wirelessly communicate using Multiple User MIMO techniques.

VARIOUS NOTES AND EXAMPLES

Each of these non-limiting examples may stand on its own or may be combined in various permutations or combinations with one or more of the other examples.

Example 1 is a computer implemented method for secure resource allocations, the method comprising: authenticating a first entity by comparing a captured image of the first entity to an image on a validated credential; determining a set of historical data describing historical resource management of a second entity from a database; determining a set of resource management pre-committal parameters for the second entity based upon the set of historical data; receiving an image of a request for a resource allocation corresponding to the second entity from the first entity; extracting resource allocation parameters from the image using optical character recognition techniques; determining a resource allocation offer including offer parameters based upon the resource management pre-committal parameters and the resource allocation parameters from the request for resource allocation, the resource allocation offer including a plurality of inter-dependent offer parameters; receiving an acceptance of the resource allocation offer from the first entity, the acceptance including a selection of ones of the plurality of inter-dependent offer parameters; and causing a resource to be allocated for the second entity based upon the accepted resource allocation offer.

In Example 2, the subject matter of Example 1 optionally includes wherein the method further comprises: authenticating an authority of the first entity to act on behalf of a second entity; receiving a secondary document regarding historical data from the first entity; extracting a set of secondary historical data describing historical resource management of the second entity from the secondary document using optical character recognition techniques; validating the set of secondary historical data using at least one validation rule; and wherein determining the set of resource management pre-committal parameters for the second entity based upon the set of historical data comprises using both the set of historical data and the set of secondary historical data.

In Example 3, the subject matter of any one or more of Examples 1-2 optionally include wherein a first parameter of the plurality of inter-dependent offer parameters changes based on a selection of a second parameter.

In Example 4, the subject matter of any one or more of Examples 1-3 optionally include wherein the method further comprises storing an executed resource allocation offer on a private blockchain database.

In Example 5, the subject matter of Example 4 optionally includes computing a hash of the executed resource allocation offer on the executed resource allocation offer; and storing the hash on a public blockchain database different than the private blockchain database.

In Example 6, the subject matter of any one or more of Examples 1-5 optionally include executing a general lien based upon the resource pre-committals by contacting a first lien service; and responsive to receiving an acceptance of the resource allocation offer from the first entity, the acceptance including a selection of ones of the plurality of inter-dependent offer parameters, executing a specific lien based upon the selection of ones of the plurality of inter-dependent offer parameters.

In Example 7, the subject matter of any one or more of Examples 1-6 optionally include wherein causing the resource to be allocated for the second entity based upon the accepted resource allocation offer comprises allocating resources to a third entity determined based upon the extracted resource allocation parameters.

In Example 8, the subject matter of any one or more of Examples 1-7 optionally include wherein the first entity is an individual authorized to act on behalf of the second entity.

In Example 9, the subject matter of any one or more of Examples 1-8 optionally include wherein the captured image of the first entity is an image of the first entity captured by a user device, and wherein the validated credential is a government issued identification.

In Example 10, the subject matter of Example 9 optionally includes wherein the government issued identification comprises one or more of, a driver's license, a state issued identification card, a military identification, or a passport.

In Example 11, the subject matter of any one or more of Examples 1-10 optionally include wherein the set of historical data includes information obtained from a credit bureau.

Example 12 is a system for secure resource allocations comprising: a processor; memory, including instructions stored thereon which, when executed by the at least one processor cause the processor to: authenticate a first entity by comparing a captured image of the first entity to an image on a validated credential; determine a set of historical data describing historical resource management of a second entity from a database; determine a set of resource management pre-committal parameters for the second entity based upon the set of historical data; receive an image of a request for resource allocation corresponding to the second entity from the first entity; extract resource allocation parameters from the image using optical character recognition techniques; determine a resource allocation offer based on the resource management pre-committal parameters and the request for resource allocation, the resource allocation offer including a plurality of inter-dependent offer parameters; receive an acceptance of the resource allocation offer from the first entity, the acceptance including a selection of the ones of the plurality of inter-dependent offer parameters; and cause a resource to be allocated for the second entity based upon the accepted resource allocation offer.

In Example 13, the subject matter of Example 12 optionally includes wherein the instructions further cause the processor to: authenticate an authority of the first entity to act on behalf of a second entity; receive a secondary document regarding historical data from the first entity; extract a set of secondary historical data describing historical resource management of the second entity from the secondary document using optical character recognition techniques; validate the set of secondary historical data using at least one validation rule; and wherein to determine the set of resource management pre-committal parameters for the second entity based upon the set of historical data comprises using both the set of historical data and the set of secondary historical data.

In Example 14, the subject matter of any one or more of Examples 12-13 optionally include wherein a first parameter of the plurality of inter-dependent offer parameters changes based on a selection of a second parameter.

In Example 15, the subject matter of any one or more of Examples 12-14 optionally include wherein the instructions further cause the processor to: compute a hash of the executed resource allocation offer on the executed resource allocation offer; and store the hash on a public blockchain database different than the private blockchain database.

In Example 16, the subject matter of any one or more of Examples 12-15 optionally include wherein the instructions further cause the processor to: execute a general lien based upon the resource pre-committals by contacting a first lien service; and responsive to receiving an acceptance of the resource allocation offer from the first entity, the acceptance including a selection of ones of the plurality of inter-dependent offer parameters, execute a specific lien based upon the selection of ones of the plurality of inter-dependent offer parameters.

In Example 17, the subject matter of any one or more of Examples 12-16 optionally include wherein to cause the resource to be allocated for the second entity based upon the accepted resource allocation offer comprises allocating resources to a third entity determined based upon the extracted resource allocation parameters.

In Example 18, the subject matter of any one or more of Examples 12-17 optionally include wherein the instructions further cause the processor to store an executed resource allocation offer on a private blockchain database.

In Example 19, the subject matter of any one or more of Examples 12-18 optionally include wherein the first entity is an individual authorized to act on behalf of the second entity.

In Example 20, the subject matter of any one or more of Examples 12-19 optionally include wherein the captured image of the first entity is an image of the first entity captured by a user device, and wherein the validated credential is a government issued identification.

In Example 21, the subject matter of Example 20 optionally includes wherein the government issued identification comprises one or more of, a driver's license, a state issued identification card, a military identification, or a passport.

In Example 22, the subject matter of any one or more of Examples 8-21 optionally include wherein the first entity is an individual authorized to act on behalf of the second entity.

Example 23 is at least one non-transitory machine-readable medium including instructions for operation of a computing system, which when executed by the machine, cause the machine to: authenticate a first entity by comparing a captured image of the first entity to an image on a validated credential; determine a set of historical data describing historical resource management of a second entity from a database; determine a set of resource management pre-committal parameters for the second entity based upon the set of historical data; receive an image of a request for resource allocation corresponding to the second entity from the first entity; extract resource allocation parameters from the image using optical character recognition techniques; determine a resource allocation offer based on the resource management pre-committal parameters and the request for resource allocation, the resource allocation offer including a plurality of inter-dependent offer parameters; receive an acceptance of the resource allocation offer from the first entity, the acceptance including a selection of the ones of the plurality of inter-dependent offer parameters; and cause a resource to be allocated for the second entity based upon the accepted resource allocation offer.

In Example 24, the subject matter of Example 23 optionally includes wherein the instructions further cause the machine to: authenticate an authority of the first entity to act on behalf of a second entity; receive a secondary document regarding historical data from the first entity; extract a set of secondary historical data describing historical resource management of the second entity from the secondary document using optical character recognition techniques; validate the set of secondary historical data using at least one validation rule; and wherein to determine the set of resource management pre-committal parameters for the second entity based upon the set of historical data comprises using both the set of historical data and the set of secondary historical data.

In Example 25, the subject matter of any one or more of Examples 23-24 optionally include wherein a first parameter of the plurality of inter-dependent offer parameters changes based on a selection of a second parameter.

In Example 26, the subject matter of any one or more of Examples 23-25 optionally include wherein the instructions further cause the machine to: compute a hash of the executed resource allocation offer on the executed resource allocation offer; and store the hash on a public blockchain database different than the private blockchain database.

In Example 27, the subject matter of any one or more of Examples 23-26 optionally include wherein the instructions further cause the machine to: execute a general lien based upon the resource pre-committals by contacting a first lien service; and responsive to receiving an acceptance of the resource allocation offer from the first entity, the acceptance including a selection of ones of the plurality of inter-dependent offer parameters, execute a specific lien based upon the selection of ones of the plurality of inter-dependent offer parameters.

In Example 28, the subject matter of any one or more of Examples 23-27 optionally include wherein to cause the resource to be allocated for the second entity based upon the accepted resource allocation offer comprises allocating resources to a third entity determined based upon the extracted resource allocation parameters.

In Example 29, the subject matter of any one or more of Examples 23-28 optionally include wherein the captured image of the first entity is an image of the first entity captured by a user device, and wherein the validated credential is a government issued identification.

In Example 30, the subject matter of any one or more of Examples 23-29 optionally include wherein the government issued identification comprises one or more of, a driver's license, a state issued identification card, a military identification, or a passport.

In Example 31, the subject matter of any one or more of Examples 23-30 optionally include wherein the set of historical data includes information obtained from a credit bureau.

Example 32 is, the machine-readable medium of Example 23, wherein the set of historical data includes information obtained from a credit bureau.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A computer implemented method for secure resource allocations, the method comprising:
   authenticating a first entity by comparing a captured image of the first entity to an image on a validated credential;
   determining a set of historical data describing historical resource management of a second entity from a database, wherein the second entity is an organization of which the first entity is at least one of an agent or employee authorized to bind the second entity, and wherein the historical data includes information on a past resource allocation to the second entity;
   determining a set of resource management pre-committal parameters for the second entity based upon the set of historical data, wherein the resource management pre-committal parameters include a score, wherein the score is for the second entity;
   receiving an image of a request for a resource allocation corresponding to the second entity from the first entity;
   extracting resource allocation parameters from the image of the request for a resource allocation by processing the image of a request for resource allocation using optical character recognition techniques;
   determining a resource allocation offer for the second entity including offer parameters based upon the resource management pre-committal parameters and the resource allocation parameters from the request for resource allocation, the resource allocation offer including a plurality of inter-dependent offer parameters;
   receiving an acceptance of the resource allocation offer from the first entity on behalf of the second entity, the acceptance including a selection of ones of the plurality of inter-dependent offer parameters; and
   causing a resource to be allocated for the second entity based upon the accepted resource allocation offer by the first entity on behalf of the second entity.

2. The method of claim 1, wherein the method further comprises:
   verifying the first entity is authorized to act on behalf of and bind the second entity, wherein verifying the first entity includes a verification from an authorized representative associated with the second entity attesting that the first entity is the at least one of an agent or employee of the second entity authorized to bind the second entity;
   receiving a secondary document regarding historical data from the first entity;
   extracting a set of secondary historical data describing historical resource management of the second entity from the secondary document using optical character recognition techniques;
   validating the set of secondary historical data using at least one validation rule; and
   wherein determining the set of resource management pre-committal parameters for the second entity based upon the set of historical data comprises using both the set of historical data and the set of secondary historical data.

3. The method of claim 1, wherein a first parameter of the plurality of inter-dependent offer parameters changes based on a selection of a second parameter.

4. The method of claim 1, further comprising:
   executing a general lien based upon the resource pre-committals by contacting a first lien service; and
   responsive to receiving an acceptance of the resource allocation offer from the first entity, the acceptance including a selection of ones of the plurality of inter-dependent offer parameters, executing a specific lien based upon the selection of ones of the plurality of inter-dependent offer parameters.

5. The method of claim 1, wherein causing the resource to be allocated for the second entity based upon the accepted resource allocation offer by the first entity comprises allocating resources to a third entity determined based upon the extracted resource allocation parameters.

6. The method of claim 1, wherein the method further comprises storing an executed resource allocation offer on a private blockchain database.

7. The method of claim 6, further comprising:
computing a hash of the executed resource allocation offer; and
storing the hash on a public blockchain database different than the private blockchain database.

8. A system for secure resource allocations comprising:
at least one processor;
memory, including instructions stored thereon which, when executed by the at least one processor cause the processor to:
authenticate a first entity by comparing a captured image of the first entity to an image on a validated credential;
determine a set of historical data describing historical resource management of a second entity from a database, wherein the second entity is an organization of which the first entity is at least one of an agent or employee authorized to bind the second entity, and wherein the historical data includes information on a past resource allocation to the second entity;
determine a set of resource management pre-committal parameters for the second entity based upon the set of historical data, wherein the resource management pre-committal parameters include a score, wherein the score is for the second entity;
receive an image of a request for resource allocation corresponding to the second entity from the first entity;
extract resource allocation parameters from the image of a request for resource allocation by processing the image of a request for resource allocation using optical character recognition techniques;
determine a resource allocation offer for the second entity based on the resource management pre-committal parameters and the request for resource allocation, the resource allocation offer including a plurality of inter-dependent offer parameters;
receive an acceptance of the resource allocation offer from the first entity on behalf of the second entity, the acceptance including a selection of ones of the plurality of inter-dependent offer parameters; and
cause a resource to be allocated for the second entity based upon the accepted resource allocation offer by the first entity.

9. The system of claim 8, wherein the instructions further cause the processor to:
verify the first entity is authorized to act on behalf of and bind the second entity, wherein verifying the first entity includes a verification from an authorized representative associated with the second entity attesting that the first entity is the at least one of an agent or employee of the second entity authorized to bind the second entity;
receive a secondary document regarding historical data from the first entity;
extract a set of secondary historical data describing historical resource management the second entity from the secondary document using optical character recognition techniques;
validate the set of secondary historical data using at least one validation rule; and
wherein to determine the set of resource management pre-committal parameters for the second entity based upon the set of historical data comprises using both the set of historical data and the set of secondary historical data.

10. The system of claim 8, wherein a first parameter of the plurality of inter-dependent offer parameters changes based on a selection of a second parameter.

11. The system of claim 8, wherein the instructions further cause the processor to:
compute a hash of the executed resource allocation offer
store the executed resource allocation offer on a private blockchain database; and
store the hash on a public blockchain database different than the private blockchain database.

12. The system of claim 8, wherein the instructions further cause the processor to:
execute a general lien based upon the resource pre-committals by contacting a first lien service; and
responsive to receiving an acceptance of the resource allocation offer from the first entity, the acceptance including a selection of ones of the plurality of inter-dependent offer parameters, execute a specific lien based upon the selection of ones of the plurality of inter-dependent offer parameters.

13. The system of claim 8, wherein to cause the resource to be allocated for the second entity based upon the accepted resource allocation offer by the first entity comprises allocating resources to a third entity determined based upon the extracted resource allocation parameters.

14. The system of claim 8, wherein the instructions further cause the processor to store an executed resource allocation offer on a private blockchain database.

15. A non-transitory machine-readable medium including instructions for operation of a computing system, which when executed by the machine, cause the machine to:
authenticate a first entity by comparing a captured image of the first entity to an image on a validated credential;
determine a set of historical data describing historical resource management of a second entity from a database, wherein the second entity is an organization of which the first entity is at least one of an agent or employee authorized to bind the second entity, and wherein the historical data includes information on a past resource allocation to the second entity;
determine a set of resource management pre-committal parameters for the second entity based upon the set of historical data, wherein the resource management pre-committal parameters include a score for the second entity;
receive an image of a request for resource allocation corresponding to the second entity from the first entity;
extract resource allocation parameters from the image of a request for resource allocation by processing the image of a request for resource allocation using optical character recognition techniques;
determine a resource allocation offer for the second entity based on the resource management pre-committal parameters and the request for resource allocation, the resource allocation offer including a plurality of inter-dependent offer parameters;
receive an acceptance of the resource allocation offer from the first entity on behalf of the second entity, the acceptance including a selection of ones of the plurality of inter-dependent offer parameters; and
cause a resource to be allocated for the second entity based upon the accepted resource allocation offer by the first entity on behalf of the second entity.

16. The non-transitory machine-readable medium of claim 15, wherein the instructions further cause the machine to:
verify the first entity is authorized to act on behalf of and bind the second entity, wherein verifying the first entity includes a verification from an authorized representative associated with the second entity attesting that the first entity is the at least one of an agent or employee of the second entity authorized to bind the second entity;
receive a secondary document regarding historical data from the first entity;
extract a set of secondary historical data describing historical resource management of the second entity from the secondary document using optical character recognition techniques;
validate the set of secondary historical data using at least one validation rule; and
wherein to determine the set of resource management pre-committal parameters for the second entity based upon the set of historical data comprises using both the set of historical data and the set of secondary historical data.

17. The non-transitory machine readable medium of claim 15, wherein a first parameter of the plurality of inter-dependent offer parameters changes based on a selection of a second parameter.

18. The non-transitory machine-readable medium of claim 15, wherein the instructions further cause the machine to:
compute a hash of the executed resource allocation offer;
store the executed resource allocation offer on a private blockchain database; and
store the hash on a public blockchain database different than the private blockchain database.

19. The non-transitory machine-readable medium of claim 15, wherein the instructions further cause the machine to:
execute a general lien based upon the resource pre-committals by contacting a first lien service; and
responsive to receiving an acceptance of the resource allocation offer from the first entity, the acceptance including a selection of ones of the plurality of inter-dependent offer parameters, execute a specific lien based upon the selection of ones of the plurality of inter-dependent offer parameters.

20. The non-transitory machine-readable medium of claim 15, wherein to cause the resource to be allocated for the second entity based upon the accepted resource allocation offer by the first entity comprises allocating resources to a third entity determined based upon the extracted resource allocation parameters.

* * * * *

UNITED STATES PATENT AND TRADEMARK OFFICE
CERTIFICATE OF CORRECTION

PATENT NO. : 11,044,106 B2
APPLICATION NO. : 16/432769
DATED : June 22, 2021
INVENTOR(S) : Tomaselli et al.

Page 1 of 1

It is certified that error appears in the above-identified patent and that said Letters Patent is hereby corrected as shown below:

In the Specification

In Column 8, Line 21, delete "1610," and insert --610,-- therefor

In Column 22, Line 52, delete "(USB)," and insert --(USB)),-- therefor

In the Claims

In Column 29, Line 61, in Claim 9, after "management", insert --of--

In Column 31, Line 24, in Claim 17, delete "machine readable" and insert --machine-readable-- therefor Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*